(12) United States Patent
Ichikawa et al.

(10) Patent No.: US 11,012,619 B2
(45) Date of Patent: May 18, 2021

(54) TRANSMISSION DEVICE, TRANSMISSION METHOD, RECEPTION DEVICE, RECEPTION METHOD, AND IMAGING DEVICE

(71) Applicant: Sony Corporation, Tokyo (JP)

(72) Inventors: Yukio Ichikawa, Saitama (JP); Makoto Urushihara, Tokyo (JP); Yukinobu Mine, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/635,404

(22) PCT Filed: Aug. 6, 2018

(86) PCT No.: PCT/JP2018/029491
§ 371 (c)(1),
(2) Date: Jan. 30, 2020

(87) PCT Pub. No.: WO2019/031468
PCT Pub. Date: Feb. 14, 2019

(65) Prior Publication Data
US 2020/0162670 A1     May 21, 2020

(30) Foreign Application Priority Data
Aug. 7, 2017   (JP) .............................. JP2017-152768

(51) Int. Cl.
*H04N 5/232* (2006.01)
*G02B 13/06* (2006.01)

(52) U.S. Cl.
CPC ......... *H04N 5/23238* (2013.01); *G02B 13/06* (2013.01)

(58) Field of Classification Search
CPC .... H04N 5/23238; H04N 5/225; H04N 5/232; G02B 13/06; G03B 15/00; G03B 19/07; G03B 37/00
See application file for complete search history.

(56) References Cited

U.S. PATENT DOCUMENTS 9,521,321 B1    12/2016    Kozko
2012/0206565 A1  8/2012    Villmer
(Continued)

FOREIGN PATENT DOCUMENTS

CN    104915374 A     9/2015
JP    2016-194784 A   11/2016
(Continued)

OTHER PUBLICATIONS

Chinese Office Action dated Feb. 2, 2021 for corresponding Chinese Application No. 201880049253.4.

*Primary Examiner* — Tracy Y. Li
(74) *Attorney, Agent, or Firm* — Michael Best & Friedrich LLP

(57) ABSTRACT

High image quality real-time distribution of omnidirectional images is enabled.
An imaging unit obtains a front image and a back image each having an ultra-wide viewing angle of greater than or equal to 180°. A transmission unit transmits the front image and the back image each having the ultra-wide viewing angle to an external device. For example, the imaging unit includes: a first imager that captures a front-side image taken in by a fisheye lens to obtain a front image having an ultra-wide viewing angle; and a second imager that captures a back-side image taken in by a fisheye lens to obtain a back image having an ultra-wide viewing angle, in which the second imager is arranged in a state of being rotated by 90° with respect to the first imager, the first imager captures the front-side image taken in by the fisheye lens in a state where (Continued)

the upper end side and the lower end side of the front-side image are partially missing, and the second imager captures the back-side image taken in by the fisheye lens in a state where the left end side and the right end side of the back-side image are partially missing.

18 Claims, 18 Drawing Sheets

(56) References Cited

U.S. PATENT DOCUMENTS

2013/0326419 A1* 12/2013 Harada .............. H04N 5/23238
  715/838
2017/0295356 A1* 10/2017 Abbas .................. H04N 13/194

FOREIGN PATENT DOCUMENTS

| JP | 2017-107549 A | 6/2017 |
| WO | 2017/014126 A1 | 1/2017 |

* cited by examiner

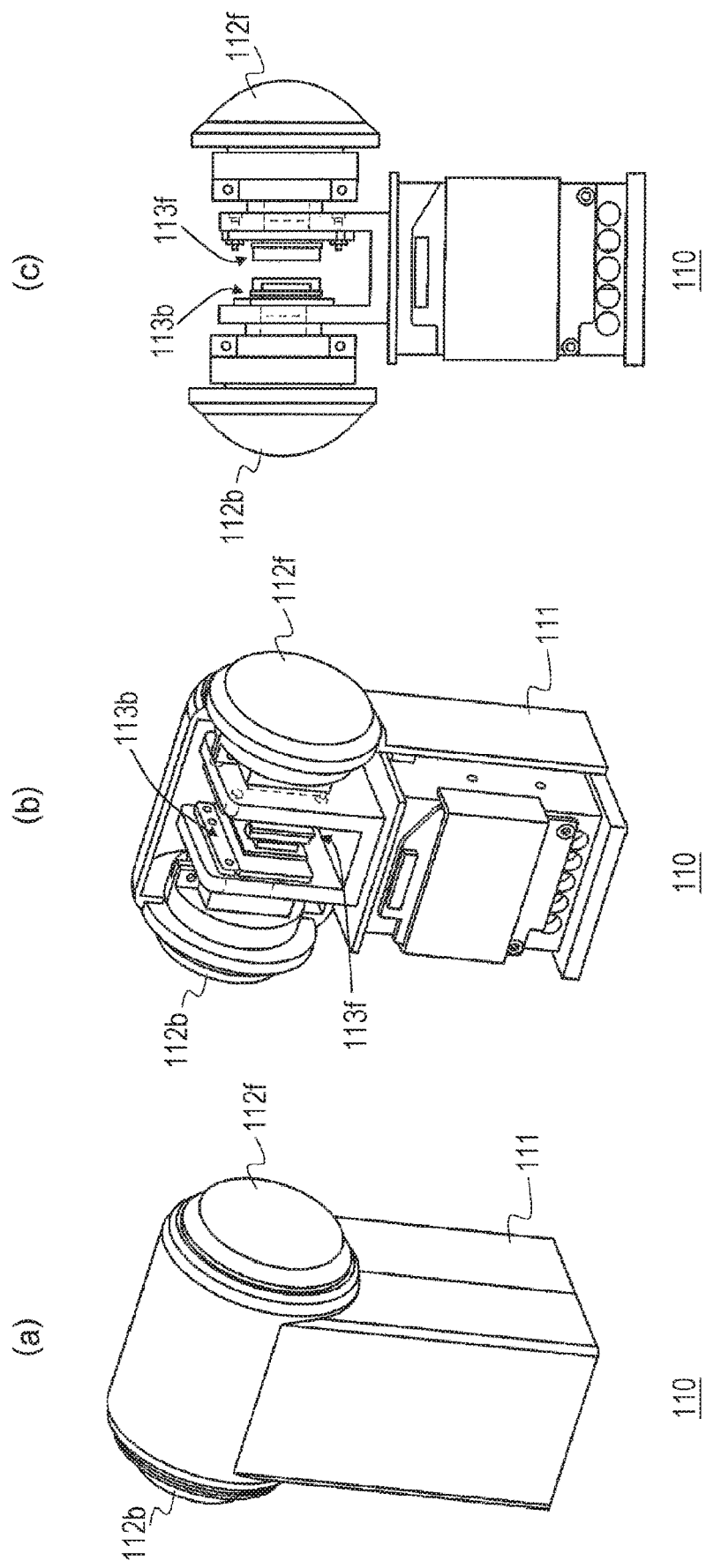

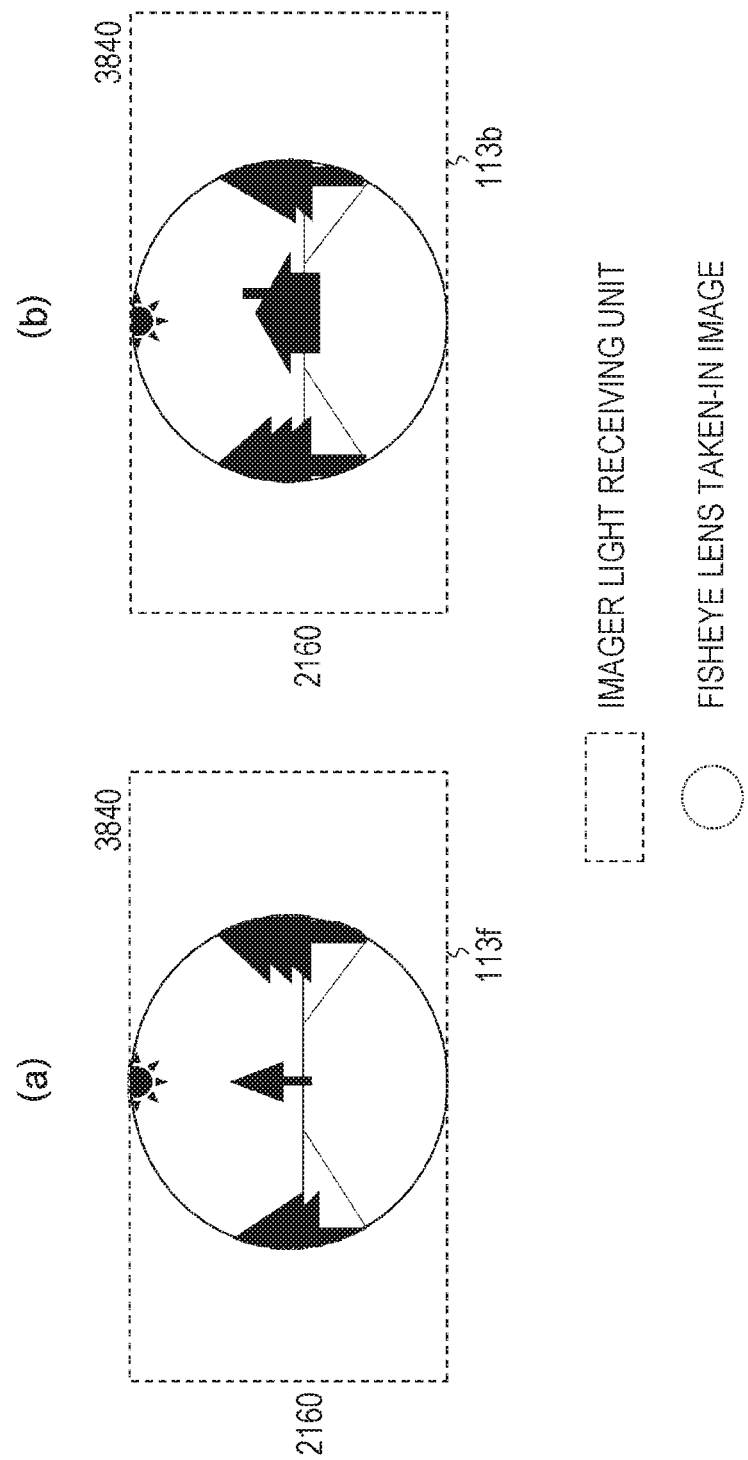

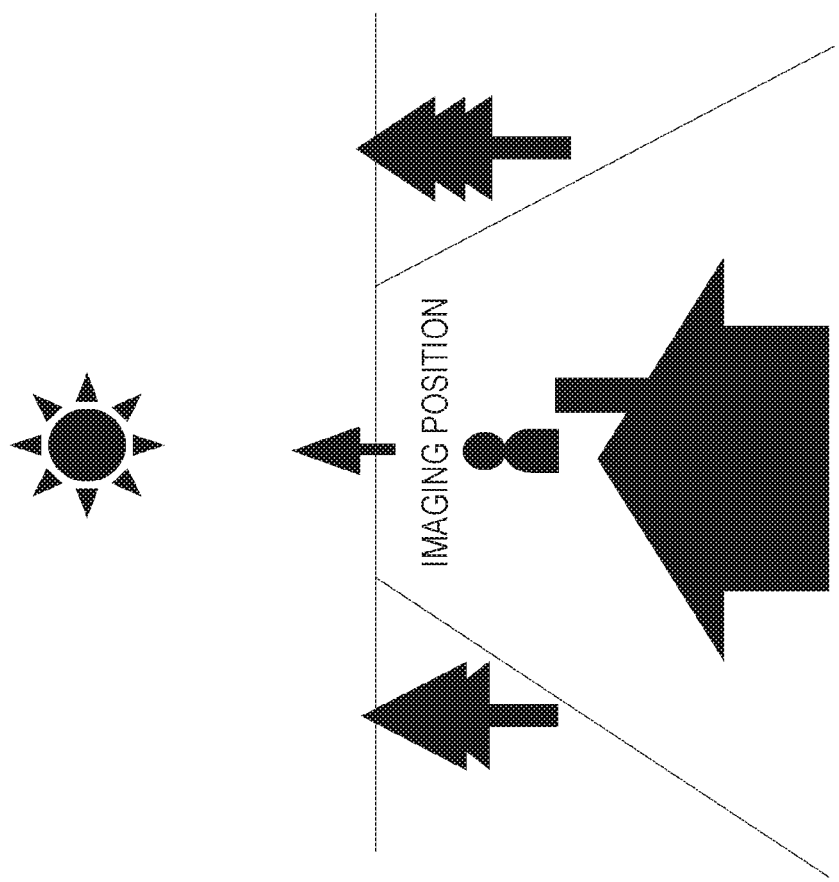

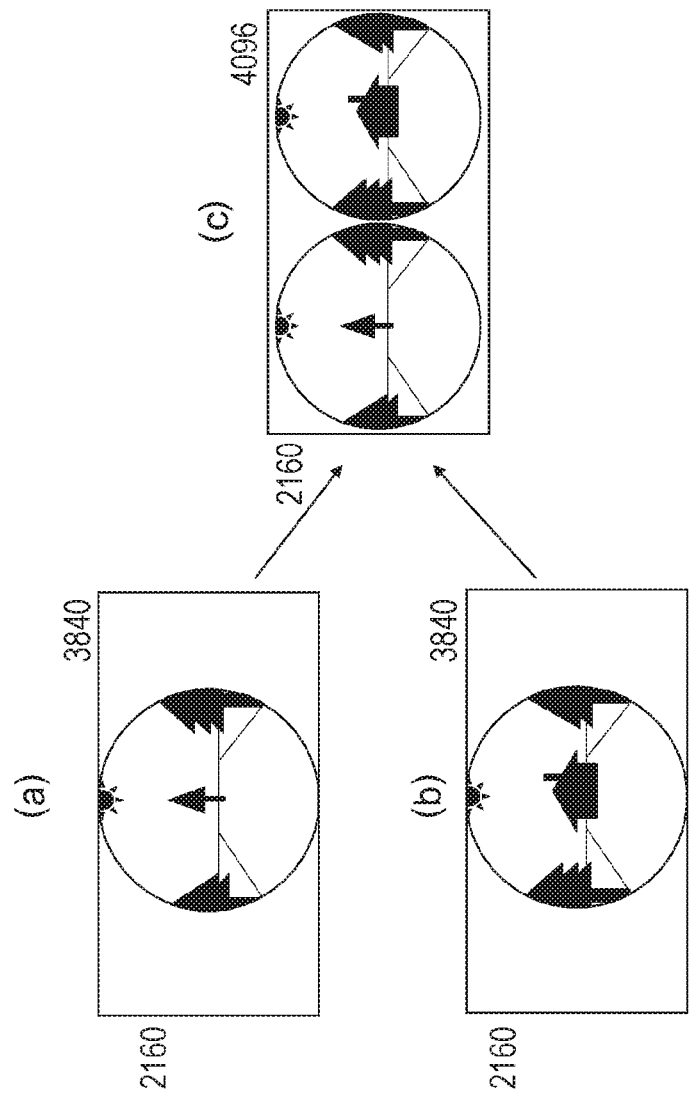

FIG. 6

| PARAMETER | | | | TYPE | DESCRIPTION |
|---|---|---|---|---|---|
| type | | | | string | PROJECT PICTURE OF ONE OR MORE FISHEYE LENSES (EQUIDISTANT PROJECTION TYPE) ON ARBITRARY UV COORDINATE |
| image | | | | object | PARAMETERS REGARDING ENTIRE IMAGE |
| | resolution | | | object | RESOLUTION |
| | | width | | number | WIDTH |
| | | height | | number | HEIGHT |
| | visible_rectangle | | | object | EFFECTIVE PIXEL RANGE |
| | | left | | number | COORDINATES OF LEFT END |
| | | top | | number | COORDINATES OF UPPER END |
| | | right | | number | COORDINATES OF RIGHT END |
| | | bottom | | number | COORDINATES OF LOWER END |
| circles | | | | array[object] | ARRAY OF PARAMETERS REGARDING CIRCULAR AREA OF FISHEYE LENS PICTURE |
| | center | | | object | POSITION OF CENTER OF CIRCLE IN ENTIRE IMAGE |
| | | x | | number | X COORDINATE |
| | | y | | number | Y COORDINATE |
| | radius | | | number | CIRCLE RADIUS |
| | rotation | | | number | CIRCLE ROTATION ANGLE (DEGREE) |
| | projection_center | | | object | UV COORDINATES OF CENTER OF CIRCLE IN PROJECTION DESTINATION |
| | | u | | number | U COORDINATE |
| | | v | | number | V COORDINATE |
| | field_of_view | | | number | FISHEYE LENS EFFECTIVE VIEWING ANGLE (DEGREE) |
| | exclusive_field_of_view | | | number | VIEWING ANGLE (DEGREE) OF AREA THAT DOES NOT OVERLAP WITH OTHER FISHEYE LENS PICTURES AT PROJECTION DESTINATION |

TRANSMISSION DEVICE, TRANSMISSION METHOD, RECEPTION DEVICE, RECEPTION METHOD, AND IMAGING DEVICE

TECHNICAL FIELD

The present technology relates to a transmission device, a transmission method, a reception device, a reception method, and an imaging device, and more particularly to a transmission device that handles a super viewing angle image for obtaining an omnidirectional image, and the like.

BACKGROUND ART

Patent Document 1 describes that an imaging device captures images in a back to back manner to obtain a front image and a back image each having an ultra-wide viewing angle of greater than or equal to 1800, and creates equirectangular images from these two images and transmits the equirectangular images to a communication terminal, and that the communication terminal creates an omnidirectional image on the basis of the equirectangular images, and cuts out an image corresponding to a user's line-of-sight direction from the omnidirectional image to obtain a display image.

CITATION LIST

Patent Document

Patent Document 1: Japanese Patent Application Laid-Open No. 2016-194784

SUMMARY OF THE INVENTION

Problems to be Solved by the Invention

In the technology described in Patent Document 1, the imaging device creates the equirectangular images from the front image and the back image each having the ultra-wide viewing angle, and transmits the equirectangular images to the communication terminal, and the communication terminal creates the omnidirectional image on the basis of the equirectangular images. Since there is an intervention of the equirectangular images, the processing load on the imaging device is heavy, and image quality degradation occurs, so that it is difficult to implement high image quality real-time distribution.

An object of the present technology is to enable high image quality real-time distribution of the omnidirectional image.

Solutions to Problems

A concept of the present technology is in
a transmission device including:
an imaging unit that obtains a front image and a back image each having an ultra-wide viewing angle of greater than or equal to 180°; and
a transmission unit that transmits the front image and the back image each having the ultra-wide viewing angle to an external device.

In the present technology, the imaging unit obtains the front image and the back image each having the ultra-wide viewing angle of greater than or equal to 180°. For example, the imaging unit may include a first imager that captures a front-side image taken in by a fisheye lens to obtain the front image having the ultra-wide viewing angle, and a second imager that captures a back-side image taken in by a fisheye lens to obtain the back image having the ultra-wide viewing angle.

In this case, for example, the second imager may be arranged in a state of being rotated by 90° with respect to the first imager, the first imager may capture the front-side image taken in by the fisheye lens in a state where the upper end side and the lower end side of the front-side image are partially missing, and the second imager may capture the back-side image taken in by the fisheye lens in a state where the left end side and the right end side of the back-side image are partially missing.

Such imaging is performed, whereby each imager can capture an image taken in by the fisheye lens in a larger size, and image quality can be improved. Note that, since the missing image portion in each imager is captured by the other imager, there is no hindrance for obtaining an omnidirectional image on a reception side.

On the reception side, the front image and the back image obtained by the two imagers are combined in a positional relationship similar to two leather coverings of a baseball, whereby the omnidirectional image is created. In this case, since a viewing angle up to a combination boundary in the left-right direction is considerably wide in the front side, users are less likely to feel incongruity in the image in the case of shaking the line-of-sight direction largely in the left-right direction.

The transmission unit transmits the front image and the back image each having the ultra-wide viewing angle to the external device. For example, the transmission unit may further transmit, together with the front image and the back image each having the ultra-wide viewing angle, lens information for obtaining the omnidirectional image by pasting the two images on the inner surface of a sphere. The lens information is transmitted as described above, whereby, in the reception side, the omnidirectional image can be easily and appropriately created from the front image and the back image each having the ultra-wide viewing angle on the basis of the lens information.

Furthermore, for example, the transmission unit may combine and transmit the front image and the back image each having the ultra-wide viewing angle. By combining and transmitting the two images as described above, a synchronization relationship between the two images can be guaranteed.

As described above, in the present technology, the front image and the back image each having the ultra-wide viewing angle obtained by the imaging unit are transmitted to the external device. Therefore, the front image and the back image each having the ultra-wide viewing angle are not converted into an equirectangular image for transmission, there is no processing load due to this conversion, there is no image quality degradation due to this conversion, and high image quality real-time distribution of the omnidirectional image becomes possible.

Furthermore, another concept of the present technology is in
a reception device including:
a reception unit that receives a front image and a back image each having an ultra-wide viewing angle of greater than or equal to 1800 from an external device, in which
the front image having the ultra-wide viewing angle is obtained by capturing a front-side image taken in by a fisheye lens in a state where the upper end side and the lower end side of the front-side image are partially missing, the front image having the ultra-wide viewing angle is obtained by capturing a back-side image taken in by a fisheye lens in a state where the left end side and the right end side of the back-side image are partially missing, and the reception device further includes an image processing unit that obtains an omnidirectional image by pasting the front image and the back image each having the ultra-wide viewing angle on an inner surface of a sphere.

In the present technology, the reception unit receives the front image and the back image each having the ultra-wide viewing angle of greater than or equal to 180° from the external device. The front image having the ultra-wide viewing angle is obtained by capturing the front-side image taken in by the fisheye lens in the state where the upper end side and the lower end side of the front-side image are partially missing. Furthermore, the front image having the ultra-wide viewing angle is obtained by capturing the back-side image taken in by the fisheye lens in the state where the left end side and the right end side of the back-side image are partially missing. The image processing unit pastes the front image and the back image each having the ultra-wide viewing angle on the inner surface of the sphere to obtain the omnidirectional image.

For example, the reception unit may further receive, together with the front image and the back image each having the ultra-wide viewing angle, lens information for obtaining the omnidirectional image by pasting the two images on the inner surface of the sphere, and the image processing unit may obtain the omnidirectional image by pasting the front image and the back image each having the ultra-wide viewing angle on the inner surface of the sphere on the basis of the lens information. In this case, the omnidirectional image can be easily and appropriately created from the front image and the back image each having the ultra-wide viewing angle.

As described above, in the present technology, the front image and the back image each having the ultra-wide viewing angle received from the external device are pasted on the inner surface of the sphere and the omnidirectional image is obtained. Therefore, the omnidirectional image is not created from an equirectangular image obtained by converting the front image and the back image each having the ultra-wide viewing angle, and the omnidirectional image can be obtained with a high image quality.

Furthermore, another concept of the present technology is in an imaging device including:

a first imager that captures a front-side image taken in by a fisheye lens to obtain a front image having an ultra-wide viewing angle; and a second imager that captures a back-side image taken in by a fisheye lens to obtain a back image having an ultra-wide viewing angle, in which the second imager is arranged in a state of being rotated by 90° with respect to the first imager, the first imager captures the front-side image taken in by the fisheye lens in a state where the upper end side and the lower end side of the front-side image are partially missing, and the second imager captures the back-side image taken in by the fisheye lens in a state where the left end side and the right end side of the back-side image are partially missing.

The imaging device of the present technology includes the first imager and the second imager. The first imager captures the front-side image taken in by the fisheye lens to obtain the front image having the ultra-wide viewing angle. The second imager captures the back-side image taken in by the fisheye lens to obtain the back image having the ultra-wide viewing angle.

The second imager is arranged in the state of being rotated by 90° with respect to the first imager. The first imager captures the front-side image taken in by the fisheye lens in the state where the upper end side and the lower end side of the front-side image are partially missing. Furthermore, the second imager captures the back-side image taken in by the fisheye lens in the state where the left end side and the right end side of the back-side image are partially missing.

As described above, in the present technology, the second imager is arranged in the state of being rotated by 90° with respect to the first imager. Therefore, each imager is enabled to capture an image taken in by the fisheye lens in a larger size, and image quality can be improved. Note that, since the missing image portion in each imager is captured by the other imager, there is no hindrance for obtaining the omnidirectional image from the two images.

Furthermore, in this case, the two images are combined in the positional relationship similar to the two leather covering of the baseball, whereby the omnidirectional image is created. Therefore, since the viewing angle up to the combination boundary in the left-right direction is considerably wide in the front side, users are less likely to feel incongruity in the image in the case of shaking the line-of-sight direction largely in the left-right direction.

Effects of the Invention

According to the present technology, high image quality real-time distribution of the omnidirectional image becomes possible. Note that, the effect described here is not necessarily limited, and can be any effect described in the present disclosure.

BRIEF DESCRIPTION OF DRAWINGS

FIG. 2 is a diagram illustrating a configuration example of a camera.

FIG. 3 is a diagram illustrating a positional relationship between a light receiving unit of each of imagers respectively constituting imaging units for a front image and a back image, and an image taken in by a fisheye lens.

FIG. 4 is a diagram illustrating an example of an imaging position.

FIG. 5 is a diagram for explaining image processing in the camera.

FIG. 6 is a diagram illustrating an example of lens information.

MODE FOR CARRYING OUT THE INVENTION

The following is a description of a mode for carrying out the invention (the mode will be hereinafter referred to as the "embodiment"). Note that, description will be made in the following order.
1. Embodiment
2. Modifications

1. EMBODIMENT

[Transmission/Reception System]

Figure 1:
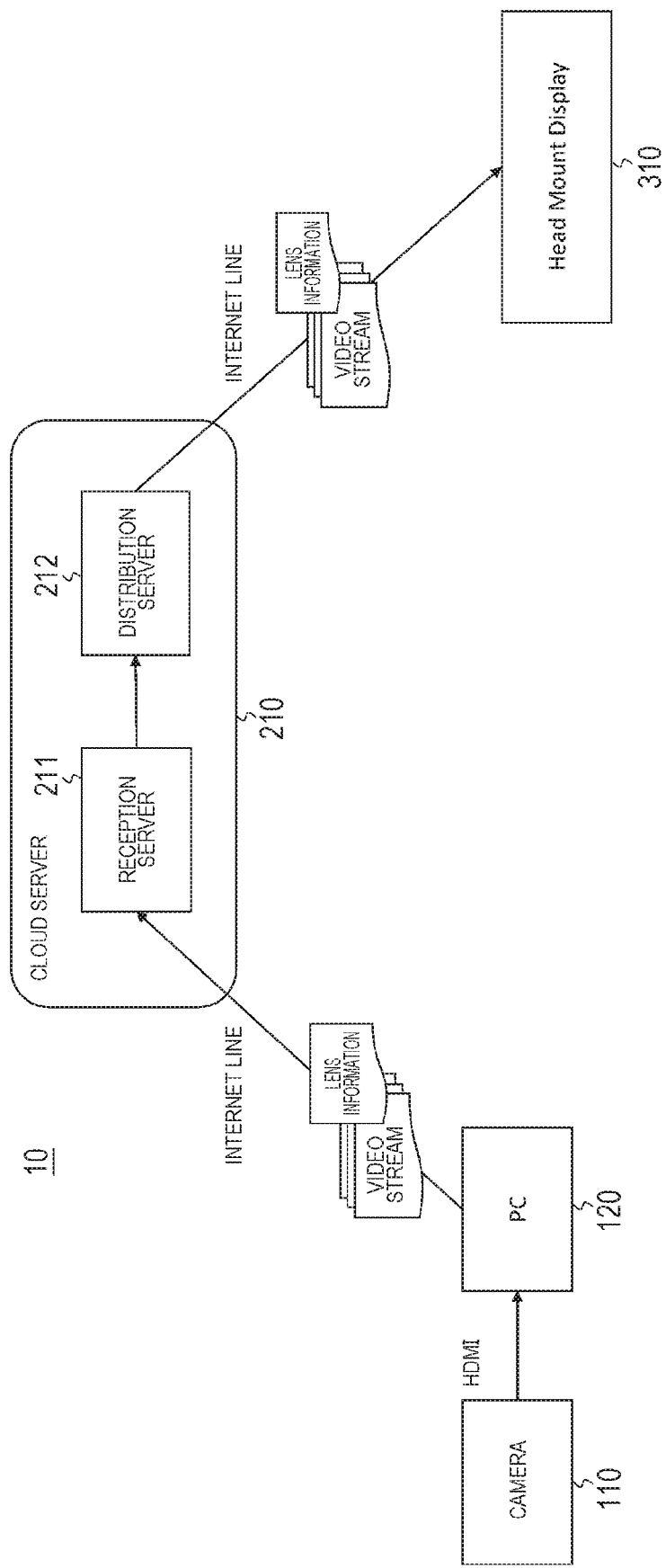
FIG. 1 is a block diagram illustrating a configuration example of a distribution system as an embodiment.

FIG. 1 illustrates a configuration example of a distribution system 10 as an embodiment. The distribution system 10 includes a camera 110 and a personal computer 120 constituting a transmission side device, a cloud server 210, and a head mounted display 310 constituting a reception side device. In the embodiment, the reception side device is the head mounted display 310, but this is not a limitation, and the reception side device may be other devices, for example, a projector, a personal computer, a smartphone, a tablet, and the like.

The camera 110 and the personal computer 120 are connected to each other via a digital interface, here high-definition multimedia interface (HDMI). Furthermore, the personal computer 120 and the cloud server 210 are connected to each other via an Internet line. Moreover, the cloud server 210 and the head mounted display 310 are connected to each other via the Internet line. Note that, "HDMI" is a registered trademark.

The camera 110 constitutes an imaging device. The camera 110 captures an image of a subject to obtain a front image and a back image each having an ultra-wide viewing angle of greater than or equal to 180°, for example, a viewing angle of 220° or 250°. The image may be either a video image or a still image, but here the image is assumed to be a video image.

The personal computer 120 transmits the front image and the back image each having the ultra-wide viewing angle obtained by the camera 110 to the head mounted display 310 as an external device through the cloud server 210. In this case, the personal computer 120 loads a video stream obtained by encoding image data in a video compression format such as H.264/AVC on a container such as MPEG2-TS, and transmits the video stream as IP streaming data.

Here, along with the transmission of the video stream, the personal computer 120 further transmits lens information for obtaining an omnidirectional image by pasting the front image and the back image each having the ultra-wide viewing angle on the inner surface of a sphere. By transmitting the lens information as described above, the head mounted display 310 can easily and appropriately create the omnidirectional image from the front image and the back image each having the ultra-wide viewing angle on the basis of the lens information.

The lens information is given to the personal computer 120 by user's operation on the transmission side. In this case, the lens information may be given manually by the user from a keyboard, or may be given from a storage medium such as a USB memory. Note that, details of the lens information will be described later. Note that, it is not always necessary to transmit the lens information together with the video stream, and a configuration may be used in which the lens information is supplied to the head mounted display 310 by another means.

The cloud server 210 includes a reception server 211 and a distribution server 212. The reception server 211 receives the IP streaming data transmitted from the personal computer 120. The distribution server 212 transmits (distributes) the IP streaming data received by the reception server 211 to the head mounted display 310.

The head mounted display 310 receives the IP streaming data from the distribution server 212, takes out the front image and the back image each having the ultra-wide viewing angle, and creates the omnidirectional image by pasting these images on the inner surface of the sphere on the basis of the lens information. Then, the head mounted display 310 extracts an image of an area corresponding to a user's line-of-sight direction from the omnidirectional image and displays the image on the display. Note that, even in a case where the reception side device is not the head mounted display 310, the omnidirectional image is created in a similar manner, and image display is performed using the omnidirectional image.

In the embodiment, there are first to third forms in which functions of the camera 110, the personal computer 120, and the head mounted display 310 are different from each other. Hereinafter, each of the forms will be further described.

"First Form"

In the camera 110, horizontal and vertical positional relationships are the same as each other between an imager constituting an imaging unit for the front image and an imager constituting an imaging unit for the back image. In this case, each imager is arranged such that its horizontal direction matches the horizontal direction of the camera 110 and its vertical direction matches the vertical direction of the camera 110. Then, in this case, each imager captures an entire image taken in by the fisheye lens.

FIGS. 2(a) to 2(c) illustrate a configuration example of the camera 110. FIG. 2(a) is a perspective view illustrating the appearance of the camera 110. The imaging units are arranged on the top of a housing 111, and there are a fisheye lens 112f constituting the imaging unit for the front image and a fisheye lens 112b constituting the imaging unit for the back image.

FIG. 2(b) is a perspective view illustrating a state where a part of the housing 111 is removed. Furthermore, FIG. 2(c) illustrates a side view illustrating a state where the housing 111 is completely removed. Inside the camera 110, there are an imager 113f that captures a front-side image taken in by the fisheye lens 112f and an imager 113b that captures a back-side image taken in by the fisheye lens 112b. The horizontal and vertical positional relationships are the same as each other between the imager 113f and the imager 113b.

FIG. 3(a) illustrates a positional relationship between a light receiving unit of the imager 113f that captures the front-side image and an image taken in by the fisheye lens 112f, in a case where the image is captured at an imaging position illustrated in FIG. 4. In this case, the image taken in by the fisheye lens 112f is entirely contained in the light receiving unit of the imager 113f, and the imager 113f captures the entire image taken in by the fisheye lens 112f.

Similarly, FIG. 3(b) illustrates a positional relationship between a light receiving unit of the imager 113b that captures the back-side image and an image taken in by the fisheye lens 112b, in the case where the image is captured at the imaging position illustrated in FIG. 4. In this case, the image taken in by the fisheye lens 112b is entirely contained in the light receiving unit of the imager 113b, and the imager 113b captures the entire image taken in by the fisheye lens 112b.

In FIGS. 3(a) and 3(b), the numerical values "3840" and "2160" indicate the resolutions of the imagers 113f and 113b, and indicate that the horizontal resolution is 3840 and the vertical resolution is 2160. Note that, the resolutions of the imagers 113f and 113b are examples, and are not limited to the resolutions.

Furthermore, in the camera 110, the front image and the back image each having the ultra-wide viewing angle obtained by imaging by the imagers 113f and 113b are combined, and image data of the combined image is sent to the personal computer 120.

FIGS. 5(a) and 5(b) illustrate examples of the front image and the back image each having the ultra-wide viewing angle captured by the imagers 113f and 113b, and FIG. 5(c) illustrates an example of the combined image. In the combined image, for example, compression processing is performed on the front image and the back image each having the ultra-wide viewing angle, and these images are arranged side by side in the horizontal direction. For example, in the combined image, the horizontal resolution is 4096 and the vertical resolution is 2160.

In the personal computer 120, the image data of the combined image sent from the camera 110 is encoded to obtain the video stream. Then, the video stream is loaded on the container such as MPEG2-TS, and transmitted as IP streaming data to the cloud server 210.

From the personal computer 120, together with the video stream, the lens information for each of the two imaging units on the front side and the back side is transmitted simultaneously. FIG. 6 illustrates an example of the lens information. Although detailed description is omitted, the lens information includes light receiving unit information such as the resolution and the like of the imager, and information on the position, size, and the like of the image taken in by the fisheye lens projected on the light receiving unit of the imager.

In the head mounted display 310, the front image and the back image each having the ultra-wide viewing angle are separated from the combined image taken out from the IP streaming data, and these images are pasted on the inner surface of the sphere on the basis of the lens information, and the omnidirectional image is created. Then, in the head mounted display 310, an image of an area corresponding to the user's line-of-sight direction is extracted from the omnidirectional image and displayed on a display (display unit).

FIG. 7(a) illustrates an example of the combined image. FIGS. 7(b) and 7(c) illustrate examples of the front image and the back image each having the ultra-wide viewing angle separated from the combined image. Furthermore, FIG. 7(d) illustrates an example of the omnidirectional image created by pasting the separated front image and back image having the ultra-wide viewing angle on the inner surface of the sphere on the basis of the lens information. For simplification of the drawing, illustration of the pasted image is omitted. Note that, "O" indicates the center of the sphere.

Figure 8:
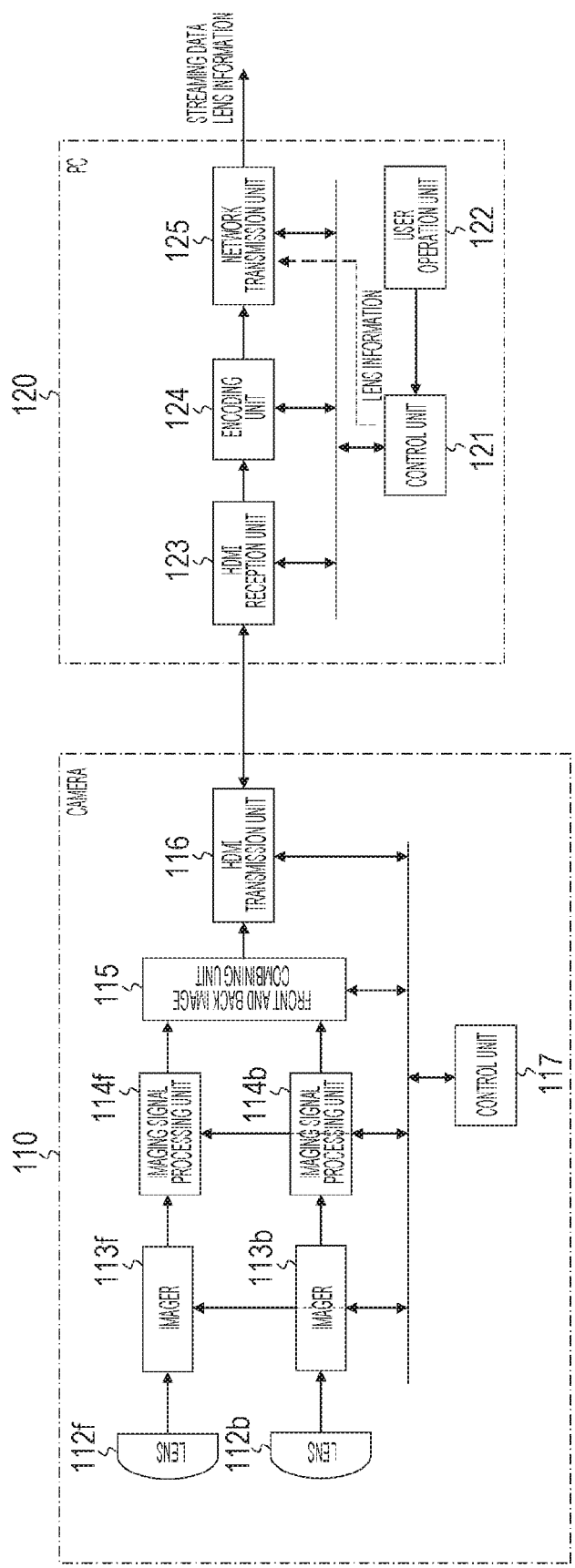
FIG. 8 is a block diagram illustrating a configuration example of the camera and a personal computer.

FIG. 8 illustrates a configuration example of the camera 110 and the personal computer 120. Note that, in the configuration example, portions not directly related to the present technology are omitted as appropriate. The camera 110 includes a control unit 117, the fisheye lenses 112f and 112b, the imagers 113f and 113b, imaging signal processing units 114f and 114b, a front and back image combining unit 115, and an HDMI transmission unit 116.

The control unit 117 controls operation of each unit of the camera 110. The fisheye lens 112f and the imager 113f constitute a front-side imaging unit. The front-side image taken in by the fisheye lens 112f is projected on the light receiving unit of the imager 113f (see FIG. 3(a)), and from the imager 113f, an imaging signal of the front image (see FIG. 5(a)) having the ultra-wide viewing angle is obtained.

The imaging signal processing unit 114f performs sample-hold and gain control, conversion from an analog signal to a digital signal, and further white balance adjustment, gamma correction, and the like on the imaging signal (analog signal) of the front image having the ultra-wide viewing angle obtained by the imager 113f, to generate image data of the front image having the ultra-wide viewing angle.

The fisheye lens 112b and the imager 113b constitute a back-side imaging unit. The back-side image taken in by the fisheye lens 112b is projected on the light receiving unit of the imager 113b (see FIG. 3(b)), and from the imager 113b, an imaging signal of the back image (see FIG. 5(b)) having the ultra-wide viewing angle is obtained.

The imaging signal processing unit 114b performs sample-hold and gain control, conversion from an analog signal to a digital signal, and further white balance adjustment, gamma correction, and the like on the imaging signal (analog signal) of the back image having the ultra-wide viewing angle obtained by the imager 113b, to generate image data of the back image having the ultra-wide viewing angle.

The front and back image combining unit 115 combines the image data of the front image and the back image each having the ultra-wide viewing angle obtained by the imaging signal processing units 114f and 114b to generate image data of the combined image (see FIG. 5(c)). The HDMI transmission unit 116 transmits the image data of the combined image obtained by the front and back image combining unit 115 to the personal computer 120 via an HDMI transmission path by communication conforming to HDMI.

The personal computer 120 includes a control unit 121, a user operation unit 122, an HDMI reception unit 123, an encoding unit 124, and a network transmission unit 125. The control unit 121 controls operation of each unit of the personal computer 120. The user operation unit 122 is a keyboard, a mouse, a touch panel, a remote controller, or the like for the user to perform various types of operation.

The HDMI reception unit 123 receives the image data of the combined image from the camera 110 via the HDMI transmission path by communication conforming to HDMI. The encoding unit 124 encodes the image data of the combined image in a video compression format such as H.264/AVC to obtain the video stream.

The network transmission unit 125 converts the video stream obtained by the encoding unit 124 into a TS packet, further converts the TS packet into an IP packet, and transmits the IP packet as IP streaming data to the cloud server 210 via the Internet line. Furthermore, the network transmission unit 125 transmits the lens information (see FIG. 6) given by the user's operation from the user operation unit 122 together with the video stream.

Figure 9:
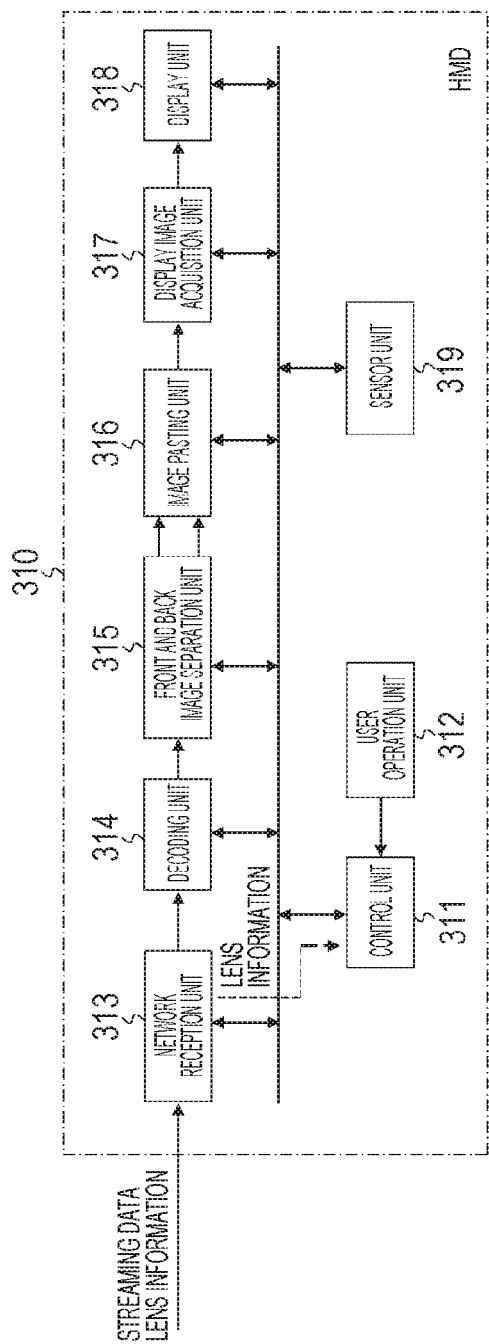
FIG. 9 is a block diagram illustrating a configuration example of the head mounted display.

FIG. 9 illustrates a configuration example of the head mounted display 310. The head mounted display 310 includes a control unit 311, a user operation unit 312, a network reception unit 313, a decoding unit 314, a front and back image separation unit 315, an image pasting unit 316, a display image acquisition unit 317, a display unit 318, and a sensor unit 319.

The control unit 311 controls operation of each unit of the head mounted display 310. The user operation unit 312 is a key, a button, a touch panel, a remote controller, or the like for the user to perform various types of operation. The network reception unit 313 receives the IP streaming data and the lens information sent from the cloud server 210.

The network reception unit 313 sends the received lens information to the control unit 311. Furthermore, the network reception unit 313 processes the received IP streaming data to obtain the video stream including encoded image data of the combined image.

Figure 7:
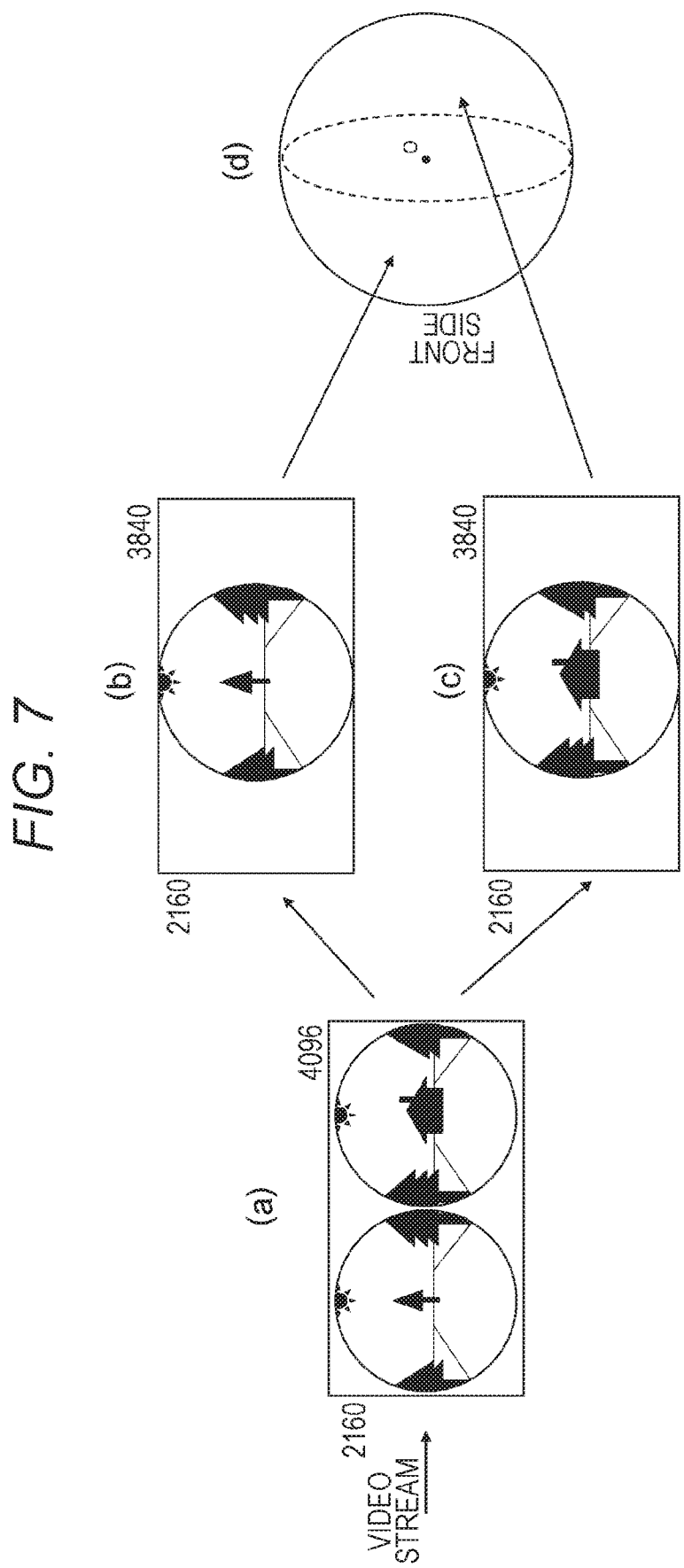
FIG. 7 is a diagram for explaining image processing in a head mounted display.

The decoding unit 314 performs decoding processing on the video stream obtained by the network reception unit 313 to obtain the image data of the combined image (see FIG. 7(*a*)). The front and back image separation unit 315 processes the image data of the combined image obtained by the decoding unit 314 to obtain the image data of the front image (see FIG. 7(*b*)) and the back image (see FIG. 7(*c*)) each having the ultra-wide viewing angle.

On the basis of the image data of the front image and the back image each having the ultra-wide viewing angle obtained by the front and back image separation unit 315 and the lens information, the image pasting unit 316 pastes (maps) the front image and the back image each having the ultra-wide viewing angle on the inner surface of the sphere to create the omnidirectional image (see FIG. 7(*d*)).

The sensor unit 319 detects the user's line-of-sight direction on the basis of detection outputs of various sensors such as an acceleration/direction sensor. The display image acquisition unit 317 extracts, as a display image, an image of an area corresponding to the user's line-of-sight direction detected by the sensor unit 319 from the omnidirectional image created by the image pasting unit 316, and outputs the image data. The display unit (display) 318 displays an image based on the image data obtained by the display image acquisition unit 317.

In the first form described above, the front image and the back image each having the ultra-wide viewing angle obtained by imaging are combined by the camera 110, and the image data of the combined image is transmitted through the cloud server 210 to the head mounted display 310 by the personal computer 120. The front image and the back image each having the ultra-wide viewing angle are not converted into an equirectangular image for transmission, there is no processing load due to this conversion, there is no image quality degradation due to this conversion, and high image quality real-time distribution of the omnidirectional image becomes possible.

"Second Form"

In the camera 110, the horizontal and vertical positional relationships are different from each other between the imager constituting the imaging unit for the front image and the imager constituting the imaging unit for the back image. In this case, the imager constituting the imaging unit for the front image is arranged such that its horizontal direction matches the horizontal direction of the camera 110 and its vertical direction matches the vertical direction of the camera 110. However, the imager constituting the imaging unit for the back image is arranged to be in a state of being rotated by 90° with respect to the imager constituting the imaging unit for the front image, and its horizontal direction matches the vertical direction of the camera 110 and its vertical direction matches the horizontal direction of the camera 110.

Then, in this case, each imager captures the image taken in by the fisheye lens in a state where the image is partially missing. In other words, in the imager constituting the imaging unit for the front image, the front-side image taken in by the fisheye lens is captured in a state where the upper end side and the lower end side of the front-side image are partially missing. On the other hand, in the imager constituting the imaging unit for the back image, the back-side image taken in by the fisheye lens is captured in a state where the left end side and the right end side of the back-side image are partially missing.

Figure 10:
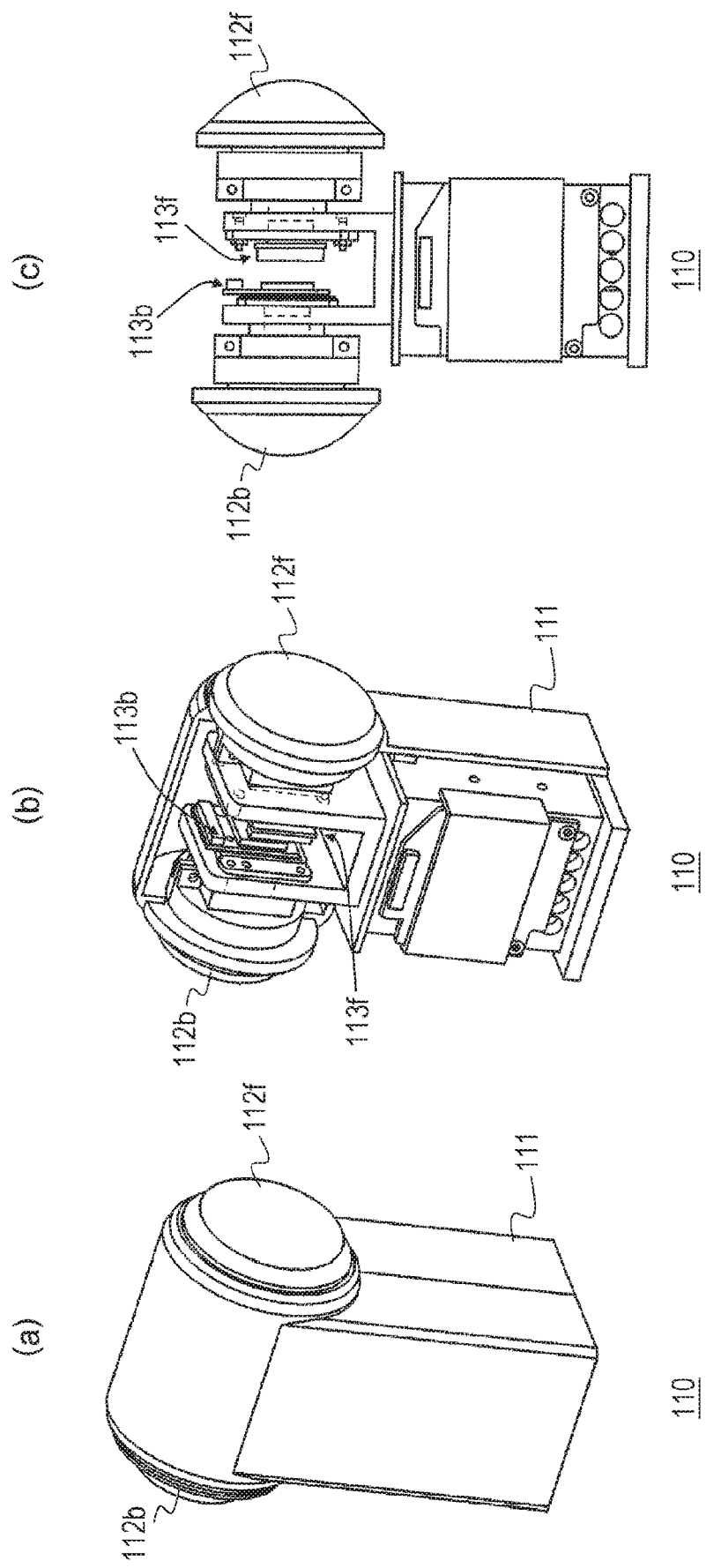
FIG. 10 is a diagram illustrating a configuration example of the camera.

FIGS. 10(*a*) to 10(*c*) illustrate a configuration example of the camera 110. FIG. 10(*a*) is a perspective view illustrating the appearance of the camera 110. The imaging units are arranged on the top of the housing 111, and there are the fisheye lens 112*f* constituting the imaging unit for the front image and the fisheye lens 112*b* constituting the imaging unit for the back image.

FIG. 10(*b*) is a perspective view illustrating a state where a part of the housing 111 is removed. Furthermore, FIG. 10(*c*) illustrates a side view illustrating a state where the front part of the housing 111 is removed. Inside the camera 110, there are the imager 113*f* that captures the front-side image taken in by the fisheye lens 112*f* and the imager 113*b* that captures the front-side image taken in by the fisheye lens 112*f*. The horizontal and vertical positional relationships are different from each other between the imager 113*f* and the imager 113*b*. In other words, the imager 113*b* is in the state of being rotated by 90° with respect to the imager 113*f*.

Figure 11:
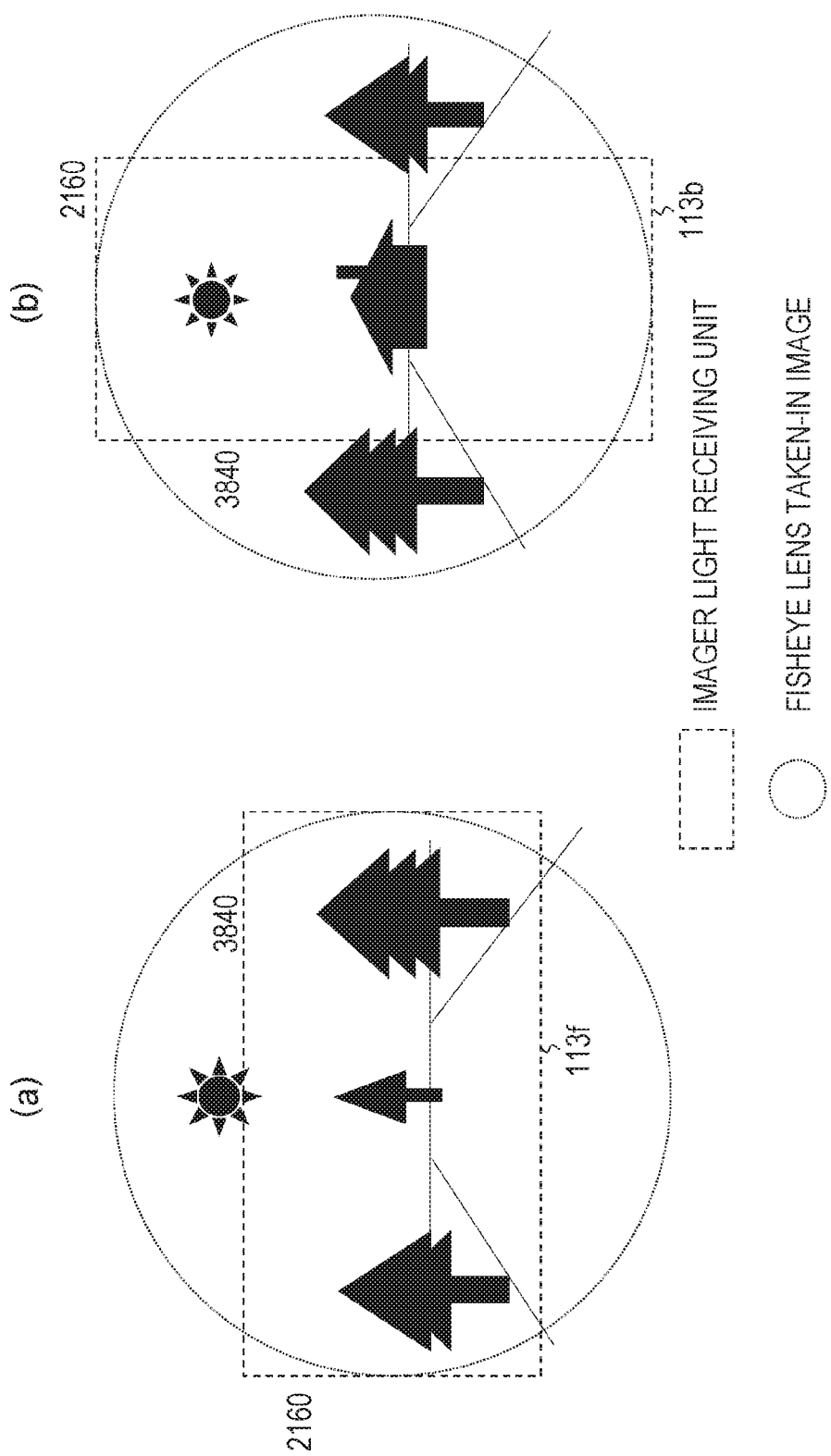
FIG. 11 is a diagram illustrating a positional relationship between a light receiving unit of each of imagers respectively constituting imaging units for a front image and a back image, and an image taken in by a fisheye lens.

FIG. 11(*a*) illustrates a positional relationship between the light receiving unit of the imager 113*f* that captures the front-side image and the image taken in by the fisheye lens 112*f*, in the case where the image is captured at the imaging position illustrated in FIG. 4. In this case, the upper end side and the lower end side of the image taken in by the fisheye lens 112*f* are partially out of the inside of the light receiving unit of the imager 113*f*, and the image taken in by the fisheye lens 112*f* in the imager 113*f* are captured in a state where the upper end side and the lower end side of the image are partially missing.

Similarly, FIG. 11(*b*) illustrates a positional relationship between the light receiving unit of the imager 113*b* that captures the back-side image and the image taken in by the fisheye lens 112*b*, in the case where the image is captured at the imaging position illustrated in FIG. 4. In this case, the left end side and the right end side of the image taken in by the fisheye lens 112*b* are partially out of the inside of the light receiving unit of the imager 113*b*, and the image taken in by the fisheye lens 112*b* in the imager 113*b* is captured in a state where the left end side and the right end side of the image are partially missing.

In FIGS. 11(*a*) and 11(*b*), the numerical values "3840" and "2160" indicate the resolutions of the imagers 113*f* and 113*b*, and indicate that the horizontal resolution is 3840 and the vertical resolution is 2160. Note that, the resolutions of the imagers 113*f* and 113*b* are examples, and are not limited to the resolutions.

In the personal computer 120, the front image and the back image each having the ultra-wide viewing angle obtained by imaging by the camera 110 are combined, and the image data of the combined image is encoded to obtain the video stream. Then, the video stream is loaded on the container such as MPEG2-TS, and transmitted as IP streaming data to the cloud server 210.

Figure 12:
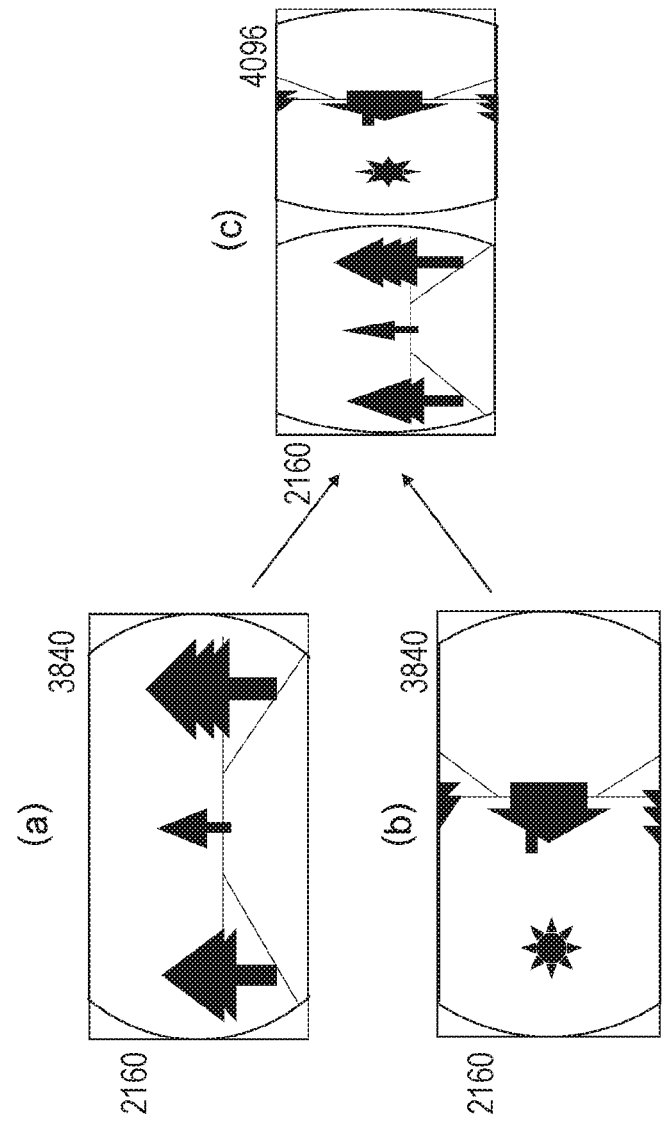
FIG. 12 is a diagram for explaining image processing in the personal computer.

FIGS. 12(*a*) and 12(*b*) illustrate examples of the front image and the back image each having the ultra-wide viewing angle captured by the imagers 113*f* and 113*b*, and FIG. 12(*c*) illustrates an example of the combined image. In the combined image, the front image and the back image each having the ultra-wide viewing angle are subjected to, for example, horizontal compression processing, and arranged side by side in the horizontal direction. For example, in the combined image, the horizontal resolution is 4096 and the vertical resolution is 2160.

From the personal computer 120, together with the video stream, the lens information (see FIG. 6) for each of the two imaging units on the front side and the back side is also transmitted to the cloud server 210. Although detailed description is omitted, the lens information includes light receiving unit information such as the resolution and the like of the imager, and information on the position, size, and the like of the image taken in by the fisheye lens projected on the light receiving unit on the imager.

In the head mounted display 310, the front image and the back image each having the ultra-wide viewing angle are separated from the combined image taken out from the IP streaming data, and the back image is subjected to 90° rotation processing, and thereafter, on the basis of the lens information, these front image and back image having the ultra-wide viewing angle are pasted on the inner surface of the sphere in a positional relationship similar to two leather coverings of a baseball, and the omnidirectional image is created. Then, in the head mounted display 310, an image of an area corresponding to the user's line-of-sight direction is extracted from the omnidirectional image and displayed on the display.

Figure 13:
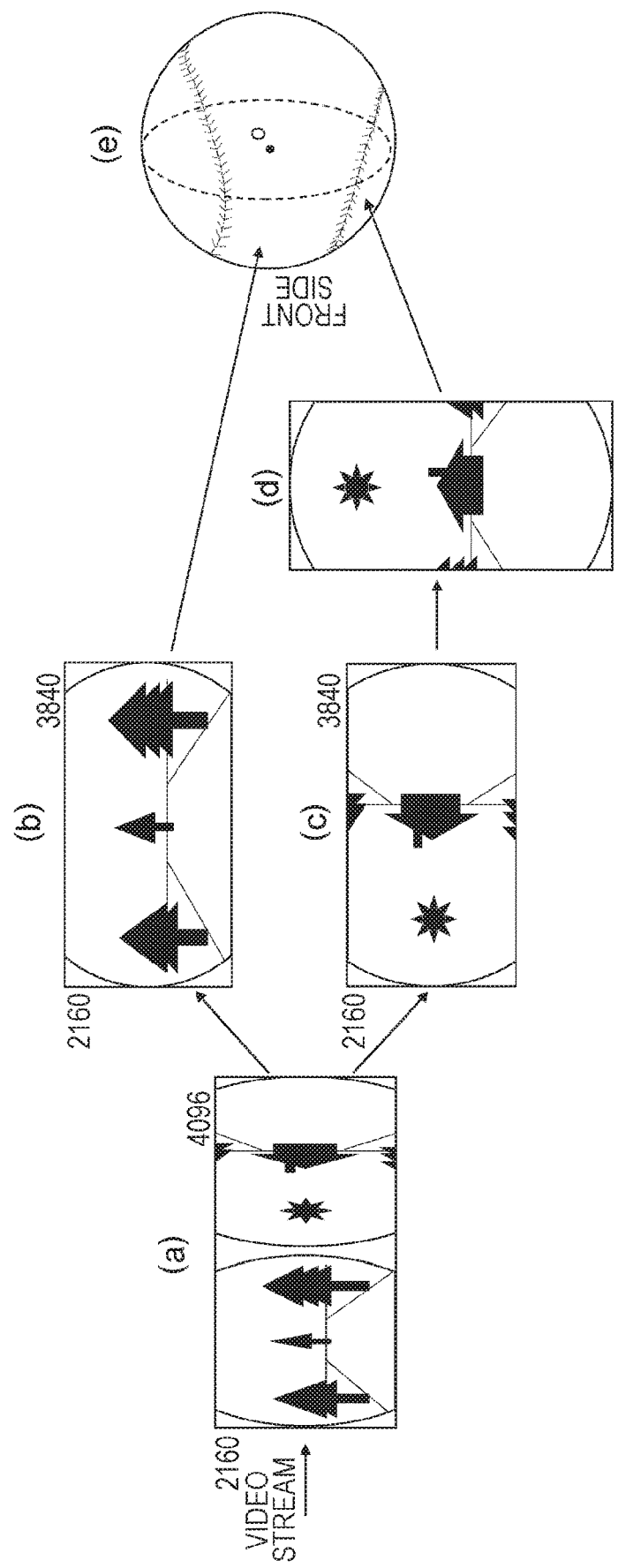
FIG. 13 is a diagram for explaining image processing in the head mounted display.

FIG. 13(*a*) illustrates an example of the combined image. FIGS. 13(*b*) and 13(*c*) illustrate examples of the front image and the back image each having the ultra-wide viewing angle separated from the combined image. Furthermore, FIG. 13(*d*) illustrates an example of the back image having the ultra-wide viewing angle after the 90° rotation processing has been performed. Then, FIG. 13(*e*) illustrates an example of the omnidirectional image created by pasting the front image and the back image each having the ultra-wide viewing angle on the inner surface of the sphere on the basis of the lens information. For simplification of the drawing, illustration of the pasted image is omitted. Furthermore, for the sake of easy understanding, the seams of the two leather coverings of the baseball are indicated. Note that, "○" indicates the center of the sphere.

Figure 14:
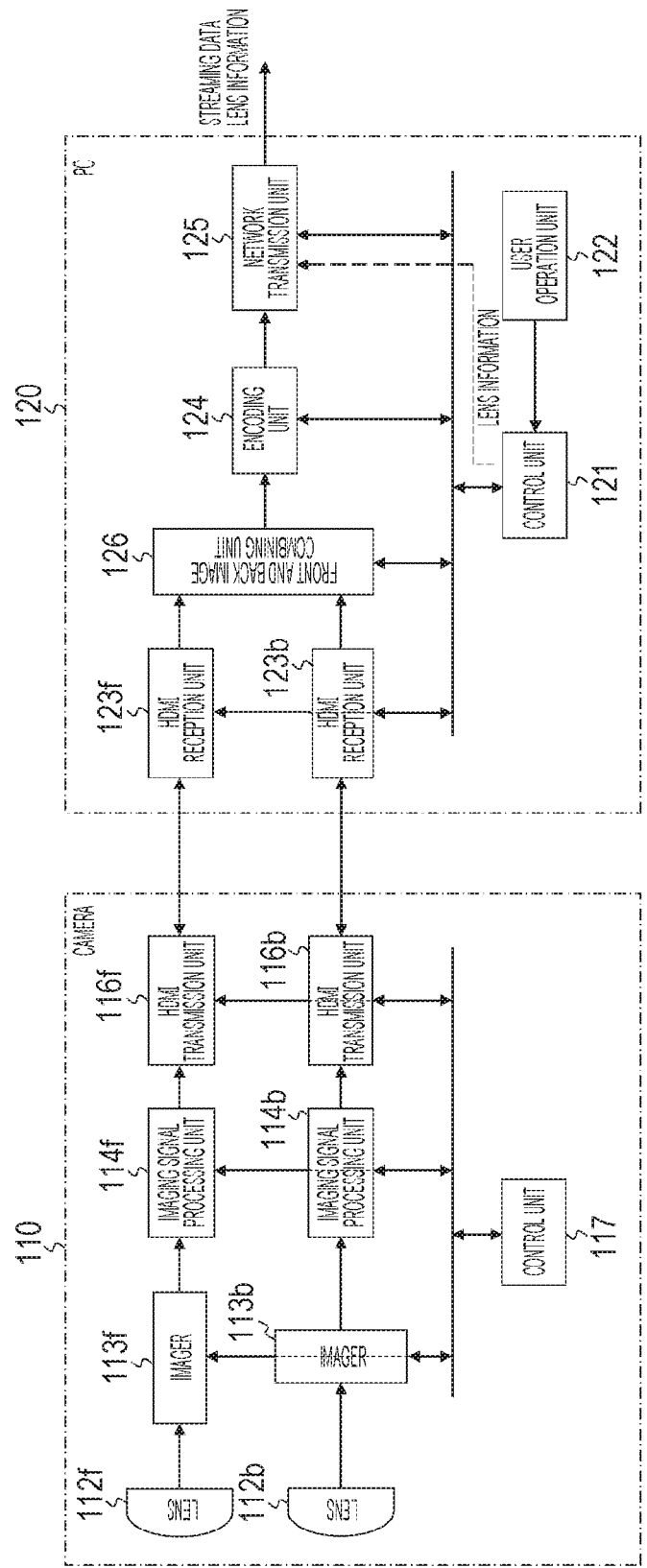
FIG. 14 is a block diagram illustrating a configuration example of the camera and the personal computer.

FIG. 14 illustrates a configuration example of the camera 110 and the personal computer 120. Note that, in the configuration example, portions not directly related to the present technology are omitted as appropriate. The camera 210 includes the control unit 117, the fisheye lenses 112*f* and 112*b*, the imagers 113*f* and 113*b*, the imaging signal processing units 114*ff* and 114*b*, and HDMI transmission units 116*f* and 116*b*.

The control unit 117 controls operation of each unit of the camera 110. The fisheye lens 112*f* and the imager 113*f* constitute a front-side imaging unit. The front-side image taken in by the fisheye lens 112*f* is projected on the light receiving unit of the imager 113*f* in a state where the upper end side and the lower end side of the front-side image are partially missing (see FIG. 11(*a*)), and from the imager 113*f*, an imaging signal is obtained of the front image (see FIG. 12(*a*)) having the ultra-wide viewing angle in a state where the upper end side and the lower end side of the front-side image are partially missing.

The imaging signal processing unit 114*f* performs sample-hold and gain control, conversion from an analog signal to a digital signal, and further white balance adjustment, gamma correction, and the like on the imaging signal (analog signal) of the front image having the ultra-wide viewing angle obtained by the imager 113*f*, to generate image data of the front image having the ultra-wide viewing angle.

The fisheye lens 112*b* and the imager 113*b* constitute a front-side imaging unit. The front-side image taken in by the fisheye lens 112*b* is projected on the light receiving unit of the imager 113*b* in a state where the left end side and the right end side of the front-side image are partially missing (see FIG. 11(*b*)), and from the imager 113*b*, an imaging signal is obtained of the back image (see FIG. 12(*b*)) having the ultra-wide viewing angle in a state where the left end side and the right end side of the front-side image are partially missing.

The imaging signal processing unit 114*b* performs sample-hold and gain control, conversion from an analog signal to a digital signal, and further white balance adjustment, gamma correction, and the like on the imaging signal (analog signal) of the back image having the ultra-wide viewing angle obtained by the imager 113*b*, to generate image data of the back image having the ultra-wide viewing angle.

The HDMI transmission unit 116*f* transmits the image data of the front image (see FIG. 12(*a*)) having the ultra-wide viewing angle obtained by the imaging signal processing unit 114*f* to the personal computer 120 via the HDMI transmission path by communication conforming to HDMI. Furthermore, the HDMI transmission unit 116*b* transmits the image data of the back image (see FIG. 12(*b*)) having the ultra-wide viewing angle obtained by the imaging signal processing unit 114*b* to the personal computer 120 via the HDMI transmission path by communication conforming to HDMI.

The personal computer 120 includes the control unit 121, the user operation unit 122, HDMI reception units 123*f* and 123*b*, a front and back image combining unit 126, the encoding unit 124, and the network transmission unit 125. The control unit 121 controls operation of each unit of the personal computer 120. The user operation unit 122 is a keyboard, a mouse, a touch panel, a remote controller, or the like for the user to perform various types of operation.

The HDMI reception unit 123*f* receives the image data of the front image (see FIG. 12(*a*)) having the ultra-wide viewing angle from the camera 110 via the HDMI transmission path by communication conforming to HDMI. Furthermore, the HDMI reception unit 123*b* receives the image data of the back image (see FIG. 12(*b*)) having the ultra-wide viewing angle from the camera 110 via the HDMI transmission path by communication conforming to HDMI.

The front and back image combining unit 115 combines the image data of the front image and the back image each having the ultra-wide viewing angle received by the HDMI reception units 123*f* and 123*b*, to generate the image data of the combined image (see FIG. 12(*c*)). The encoding unit 124 encodes the image data of the combined image in a video compression format such as H.264/AVC to obtain the video stream.

The network transmission unit 125 converts the video stream obtained by the encoding unit 124 into a TS packet, further converts the TS packet into an IP packet, and transmits the IP packet as IP streaming data to the cloud server 210 via the Internet line. Furthermore, the network transmission unit 125 transmits the lens information (see FIG. 6) given by the user's operation from the user operation unit 122 together with the video stream.

Figure 15:
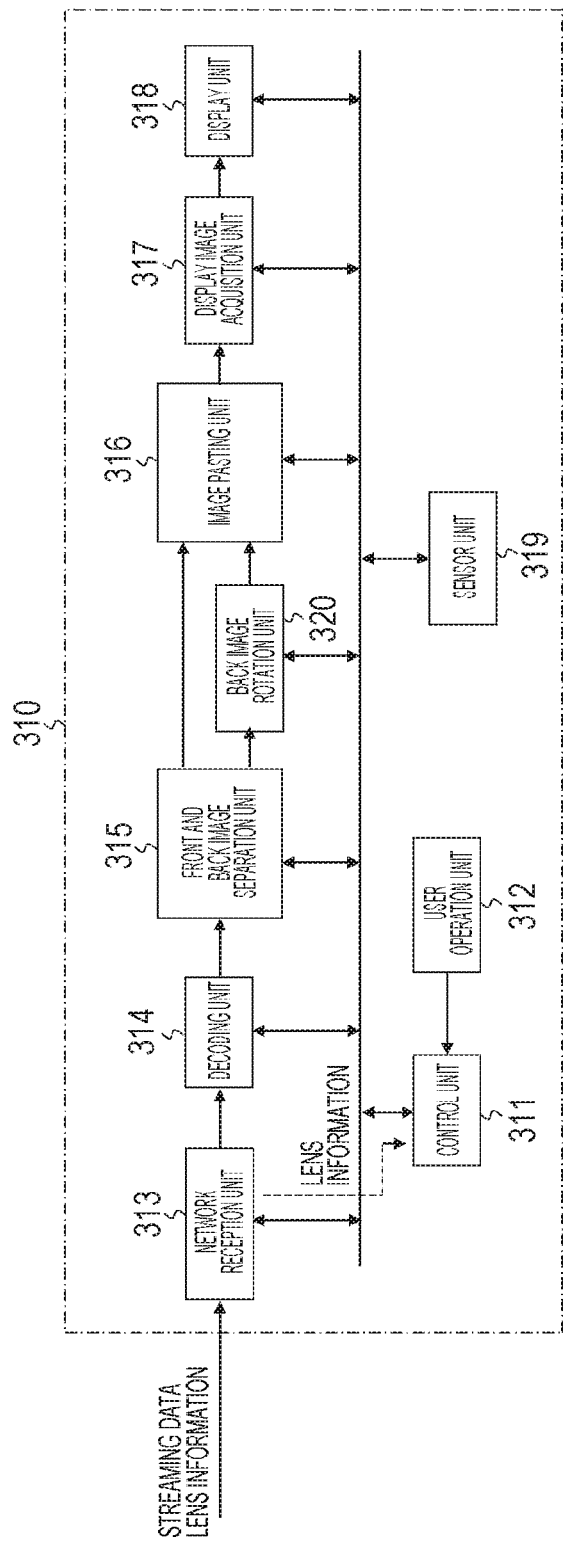
FIG. 15 is a block diagram illustrating a configuration example of the head mounted display.

FIG. 15 illustrates a configuration example of the head mounted display 310. The head mounted display 310 includes the control unit 311, the user operation unit 312, the network reception unit 313, the decoding unit 314, the front and back image separation unit 315, a back image rotation unit 320, the image pasting unit 316, the display image acquisition unit 317, the display unit 318, and the sensor unit 319.

The control unit 311 controls operation of each unit of the head mounted display 310. The user operation unit 312 is a key, a button, a touch panel, a remote controller, or the like for the user to perform various types of operation. The network reception unit 313 receives the IP streaming data and the lens information sent from the cloud server 210.

The network reception unit 313 sends the received lens information to the control unit 311. Furthermore, the network reception unit 313 processes the received IP streaming data to obtain the video stream including encoded image data of the combined image.

The decoding unit 314 performs decoding processing on the video stream obtained by the network reception unit 313 to obtain the image data of the combined image (see FIG. 13(a)). The front and back image separation unit 315 processes the image data of the combined image obtained by the decoding unit 314, to obtain the image data of the front image (see FIG. 13(b)) and the back image (see FIG. 13(c)) each having the ultra-wide viewing angle.

The back image rotation unit 320 performs processing of rotating by 90° on the image data of the back image having the ultra-wide viewing angle obtained by the front and back image separation unit 315, to obtain the image data of the back image (see FIG. 13(d)) having the ultra-wide viewing angle in which the horizontal and vertical relationship is returned to the original position. On the basis of the lens information and each of the image data of the front image having the ultra-wide viewing angle obtained by the front and back image separation unit 315 and the image data of the back image having the ultra-wide viewing angle subjected to the rotation processing by the back image rotation unit 320, the image pasting unit 316 pastes (maps) the front image and the back image each having the ultra-wide viewing angle on the inner surface of the sphere to create the omnidirectional image (see FIG. 13(e)).

Here, the front image and the back image each having the ultra-wide viewing angle are pasted on the inner surface of the sphere in the positional relationship similar to the two leather coverings of the baseball, and the omnidirectional image is created. In this case, since a viewing angle up to a combination boundary in the left-right direction is considerably wide in the front side, users are less likely to feel incongruity in the image in the case of shaking the line-of-sight direction largely in the left-right direction. Note that, although not described above, in the camera 110, an imaging direction is set so that the combination boundary is at a position that does not overlap a main subject direction such as a stage direction, for example.

The sensor unit 319 detects the user's line-of-sight direction on the basis of detection outputs of various sensors such as an acceleration/direction sensor. The display image acquisition unit 317 extracts, as a display image, an image of an area corresponding to the user's line-of-sight direction detected by the sensor unit 319 from the omnidirectional image created by the image pasting unit 316, and outputs the image data. The display unit (display) 318 displays an image based on the image data obtained by the display image acquisition unit 317.

In the second form described above, the front image and the back image each having the ultra-wide viewing angle obtained by the camera 110 are combined by the personal computer 120, and the image data of the combined image is transmitted through the cloud server 210 to the head mounted display 310. Therefore, the front image and the back image each having the ultra-wide viewing angle are not converted into an equirectangular image for transmission, there is no processing load due to this conversion, there is no image quality degradation due to this conversion, and high image quality real-time distribution of the omnidirectional image becomes possible.

Furthermore, in the second form, the imager 113b constituting the imaging unit for the back image is arranged in a state of being rotated by 90° with respect to the imager 113f constituting the imaging unit for the front image, the imager 113f captures the front-side image taken in by the fisheye lens 112f in a state where the upper end side and the lower end side of the front-side image are partially missing, and the imager 113b captures the back-side image taken in by the fisheye lens 112b in a state where the left end side and the right end side of the back-side image are partially missing.

Therefore, each imager can capture an image taken in by the fisheye lens in a larger size, and image quality can be improved. Note that, since the missing image portion in each imager is captured by the other imager, there is no hindrance for obtaining the omnidirectional image by the head mounted display 310.

Furthermore, in the second form, the head mounted display 310 creates the omnidirectional image by combining the front image and the back image obtained by the two imagers in the positional relationship similar to the two leather coverings of the baseball. Therefore, since the viewing angle up to the combination boundary in the left-right direction is considerably wide in the front side, users are less likely to feel incongruity in the image in the case of shaking the line-of-sight direction largely in the left-right direction.

"Third Form"

In the camera 110, similarly to the second form, the horizontal and vertical positional relationships are different from each other between the imager constituting the imaging unit for the front image and the imager constituting the imaging unit for the back image. In this case, the imager constituting the imaging unit for the front image is arranged such that its horizontal direction matches the horizontal direction of the camera 110 and its vertical direction matches the vertical direction of the camera 110. However, the imager constituting the imaging unit for the back image is arranged to be in a state of being rotated by 90° with respect to the imager constituting the imaging unit for the front image, and its horizontal direction matches the vertical direction of the camera 110 and its vertical direction matches the horizontal direction of the camera 110.

Then, in this case, each imager captures the image taken in by the fisheye lens in a state where the image is partially missing. In other words, in the imager constituting the imaging unit for the front image, the front-side image taken in by the fisheye lens is captured in a state where the upper end side and the lower end side of the front-side image are partially missing. On the other hand, in the imager constituting the imaging unit for the back image, the back-side image taken in by the fisheye lens is captured in a state where the left end side and the right end side of the back-side image are partially missing.

In the personal computer 120, the image data of the front image and the back image each having the ultra-wide viewing angle obtained by imaging by the camera 110 are encoded to obtain respective video streams. Then, each video stream is loaded on the container such as MPEG2-TS, and transmitted as IP streaming data to the cloud server 210.

From the personal computer 120, together with each video stream, the lens information (see FIG. 6) for each of the two imaging units on the front side and the back side is also transmitted to the cloud server 210. Although detailed description is omitted, the lens information includes light receiving unit information such as the resolution and the like of the imager, and information on the position, size, and the like of the image taken in by the fisheye lens projected on the light receiving unit on the imager.

In the head mounted display 310, the front image and the back image each having the ultra-wide viewing angle are taken out from the IP streaming data, and the back image is subjected to 90° rotation processing, and thereafter, on the basis of the lens information, these front image and back image having the ultra-wide viewing angle are pasted on the inner surface of the sphere in the positional relationship similar to the two leather coverings of the baseball, and the omnidirectional image is created. Then, in the head mounted display 310, an image of an area corresponding to the user's line-of-sight direction is extracted from the omnidirectional image and displayed on the display.

Figure 16:
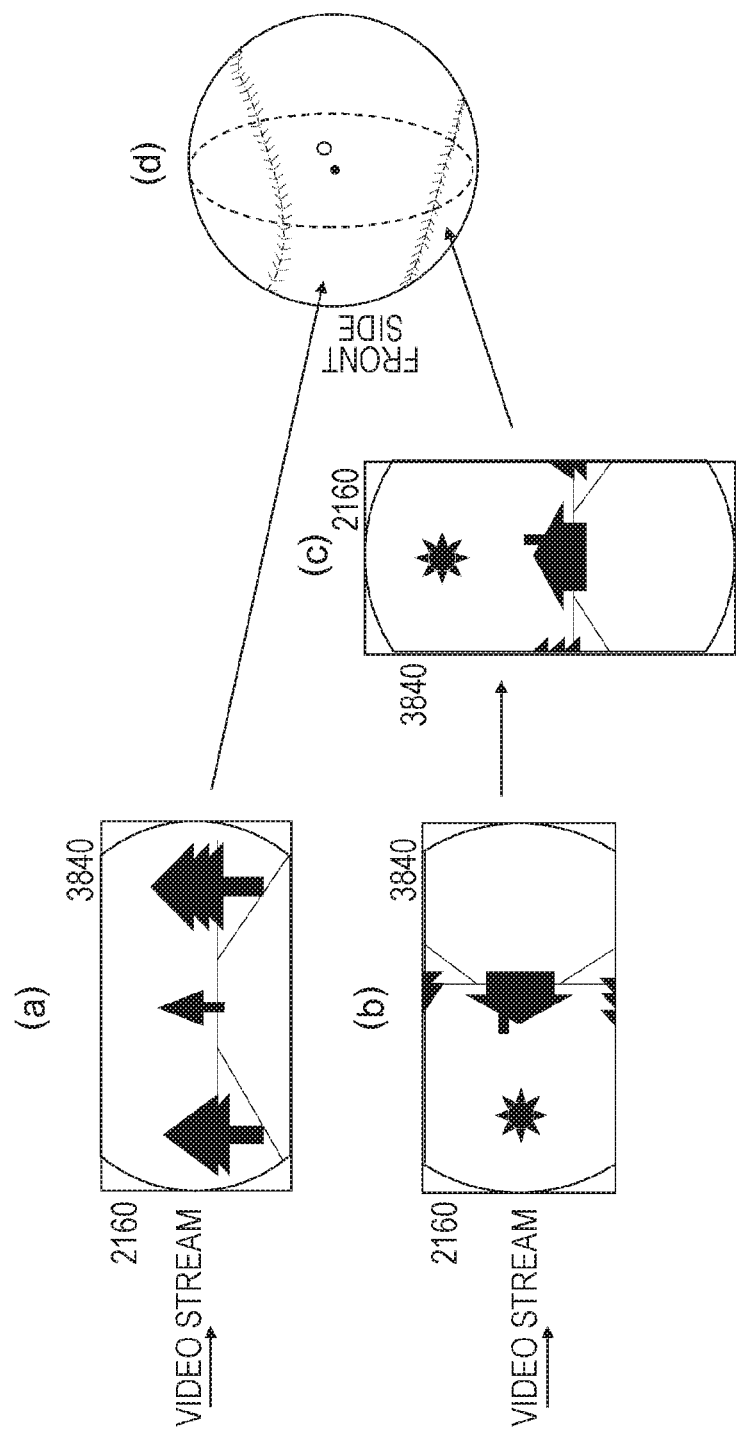
FIG. 16 is a diagram for explaining image processing in the head mounted display.

FIG. 16(a) illustrates an example of the front image having the ultra-wide viewing angle. FIG. 16(b) illustrates an example of the back image having the ultra-wide viewing angle. Furthermore, FIG. 16(c) illustrates an example of the back image having the ultra-wide viewing angle after the 90° rotation processing has been performed. Then, FIG. 16(d) illustrates an example of the omnidirectional image created by pasting the front image and the back image each having the ultra-wide viewing angle on the inner surface of the sphere on the basis of the lens information. For simplification of the drawing, illustration of the pasted image is omitted. Furthermore, for the sake of easy understanding, the seams of the two leather coverings of the baseball are indicated. Note that, "○" indicates the center of the sphere.

Figure 17:
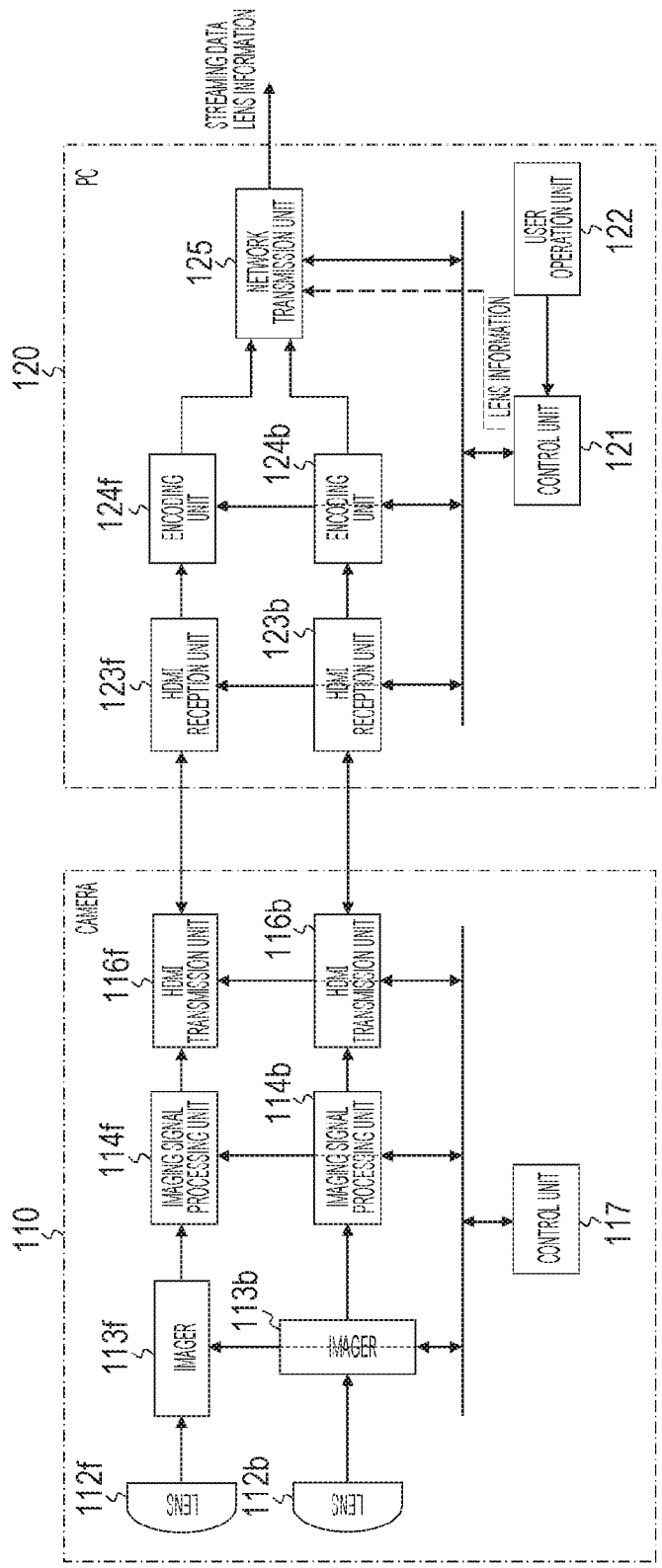
FIG. 17 is a block diagram illustrating a configuration example of the camera and the personal computer.

FIG. 17 illustrates a configuration example of the camera 110 and the personal computer 120. Note that, in the configuration example, portions not directly related to the present technology are omitted as appropriate. The camera 210 includes the control unit 117, the fisheye lenses 112$f$ and 112$b$, the imagers 113$f$ and 113$b$, the imaging signal processing units 114$ff$ and 114$b$, and HDMI transmission units 116$f$ and 116$b$.

The control unit 117 controls operation of each unit of the camera 110. The fisheye lens 112$f$ and the imager 113$f$ constitute a front-side imaging unit. The front-side image taken in by the fisheye lens 112$f$ is projected on the light receiving unit of the imager 113$f$ in a state where the upper end side and the lower end side of the front-side image are partially missing (see FIG. 11(a)), and from the imager 113$f$, an imaging signal is obtained of the front image (see FIG. 12(a)) having the ultra-wide viewing angle in a state where the upper end side and the lower end side of the front-side image are partially missing.

The imaging signal processing unit 114$f$ performs sample-hold and gain control, conversion from an analog signal to a digital signal, and further white balance adjustment, gamma correction, and the like on the imaging signal (analog signal) of the front image having the ultra-wide viewing angle obtained by the imager 113$f$, to generate image data of the front image having the ultra-wide viewing angle.

The fisheye lens 112$b$ and the imager 113$b$ constitute a front-side imaging unit. The front-side image taken in by the fisheye lens 112$b$ is projected on the light receiving unit of the imager 113$b$ in a state where the left end side and the right end side of the front-side image are partially missing (see FIG. 11(b)), and from the imager 113$b$, an imaging signal is obtained of the back image (see FIG. 12(b)) having the ultra-wide viewing angle in a state where the left end side and the right end side of the front-side image are partially missing.

The imaging signal processing unit 114$b$ performs sample-hold and gain control, conversion from an analog signal to a digital signal, and further white balance adjustment, gamma correction, and the like on the imaging signal (analog signal) of the back image having the ultra-wide viewing angle obtained by the imager 113$b$, to generate image data of the back image having the ultra-wide viewing angle.

The HDMI transmission unit 116$f$ transmits the image data of the front image (see FIG. 12(a)) having the ultra-wide viewing angle obtained by the imaging signal processing unit 114$f$ to the personal computer 120 via the HDMI transmission path by communication conforming to HDMI. Furthermore, the HDMI transmission unit 116$b$ transmits the image data of the back image (see FIG. 12(b)) having the ultra-wide viewing angle obtained by the imaging signal processing unit 114$b$ to the personal computer 120 via the HDMI transmission path by communication conforming to HDMI.

The personal computer 120 includes the control unit 121, the user operation unit 122, the HDMI reception units 123$f$ and 123$b$, encoding units 124$f$ and 124$b$, and the network transmission unit 125. The control unit 121 controls operation of each unit of the personal computer 120. The user operation unit 122 is a keyboard, a mouse, a touch panel, a remote controller, or the like for the user to perform various types of operation.

The HDMI reception unit 123$f$ receives the image data of the front image (see FIG. 12(a)) having the ultra-wide viewing angle from the camera 110 via the HDMI transmission path by communication conforming to HDMI. Furthermore, the HDMI reception unit 123$b$ receives the image data of the back image (see FIG. 12(b)) having the ultra-wide viewing angle from the camera 110 via the HDMI transmission path by communication conforming to HDMI.

The encoding unit 124$f$ encodes the image data of the front image having the ultra-wide viewing angle received by the HDMI reception unit 123$f$ in a video compression format such as H.264/AVC to obtain the video stream of the front image. Furthermore, the encoding unit 124$f$ encodes the image data of the back image having the ultra-wide viewing angle received by the HDMI reception unit 123$b$ in a video compression format such as H.264/AVC to obtain the video stream of the back image.

The network transmission unit 125 converts the video streams obtained by the encoding units 124$f$ and 124$b$ into TS packets, further converts the TS packets into IP packets, and transmits the IP packets as IP streaming data to the cloud server 210 via the Internet line. Furthermore, the network transmission unit 125 transmits the lens information (see FIG. 6) given by the user's operation from the user operation unit 122 together with the video stream.

Figure 18:
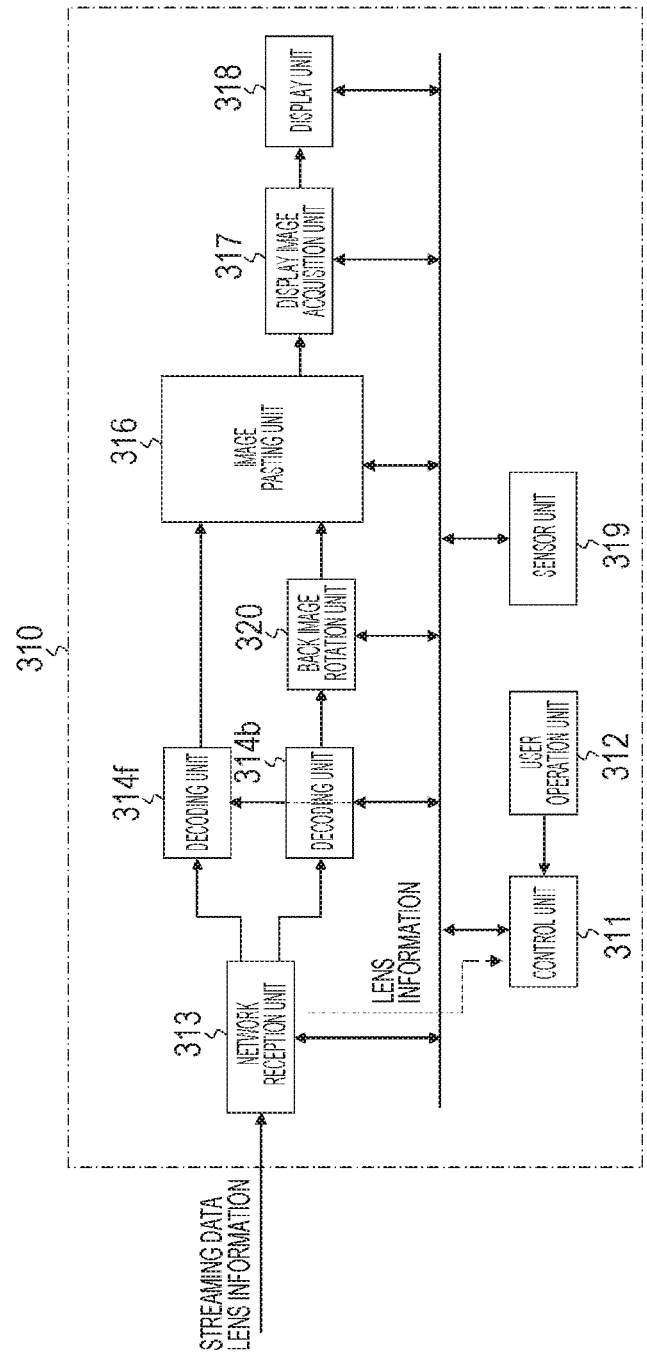
FIG. 18 is a block diagram illustrating a configuration example of the head mounted display.

FIG. 18 illustrates a configuration example of the head mounted display 310. The head mounted display 310 includes the control unit 311, the user operation unit 312, the network reception unit 313, decoding units 314f and 314b, the back image rotation unit 320, the image pasting unit 316, the display image acquisition unit 317, the display unit 318, and the sensor unit 319.

The control unit 311 controls operation of each unit of the head mounted display 310. The user operation unit 312 is a key, a button, a touch panel, a remote controller, or the like for the user to perform various types of operation. The network reception unit 313 receives the IP streaming data and the lens information sent from the cloud server 210.

The network reception unit 313 sends the received lens information to the control unit 311. Furthermore, the network reception unit 313 processes the received IP streaming data to obtain the video stream of the front image and the video stream of the back image.

The decoding unit 314f performs decoding processing on the video stream of the front image obtained by the network reception unit 313 to obtain the image data of the front image (see FIG. 16(a)) having the ultra-wide viewing angle. Furthermore, the decoding unit 314b performs decoding processing on the video stream of the back image obtained by the network reception unit 313 to obtain the image data of the back image (see FIG. 16(b)) having the ultra-wide viewing angle.

The back image rotation unit 320 performs processing of rotating by 90° on the image data of the back image having the ultra-wide viewing angle obtained by the decoding unit 314b, to obtain the image data of the back image (see FIG. 16(c)) having the ultra-wide viewing angle in which the horizontal and vertical relationship is returned to the original position. On the basis of the lens information and each of the image data of the front image having the ultra-wide viewing angle obtained by the decoding unit 314f and the image data of the back image having the ultra-wide viewing angle subjected to the rotation processing by the back image rotation unit 320, the image pasting unit 316 pastes (maps) the front image and the back image each having the ultra-wide viewing angle on the inner surface of the sphere to create the omnidirectional image (see FIG. 16(d)).

Here, the front image and the back image each having the ultra-wide viewing angle are pasted on the inner surface of the sphere in the positional relationship similar to the two leather coverings of the baseball, and the omnidirectional image is created. In this case, since a viewing angle up to a combination boundary in the left-right direction is considerably wide in the front side, users are less likely to feel incongruity in the image in the case of shaking the line-of-sight direction largely in the left-right direction. Note that, although not described above, in the camera 110, an imaging direction is set so that the combination boundary is at a position that does not overlap a main subject direction such as a stage direction, for example.

The sensor unit 319 detects the user's line-of-sight direction on the basis of detection outputs of various sensors such as an acceleration/direction sensor. The display image acquisition unit 317 extracts, as a display image, an image of an area corresponding to the user's line-of-sight direction detected by the sensor unit 319 from the omnidirectional image created by the image pasting unit 316, and outputs the image data. The display unit (display) 318 displays an image based on the image data obtained by the display image acquisition unit 317.

In the third form described above, the image data of the front image and the back image each having the ultra-wide viewing angle obtained by the camera 110 is transmitted from the personal computer 120 through the cloud server 210 to the head mounted display 310. Therefore, the front image and the back image each having the ultra-wide viewing angle are not converted into an equirectangular image for transmission, there is no processing load due to this conversion, there is no image quality degradation due to this conversion, and high image quality real-time distribution of the omnidirectional image becomes possible.

Furthermore, in the third form, the imager 113b constituting the imaging unit for the back image is arranged in a state of being rotated by 90° with respect to the imager 113f constituting the imaging unit for the front image, the imager 113f captures the front-side image taken in by the fisheye lens 112f in a state where the upper end side and the lower end side of the front-side image are partially missing, and the imager 113b captures the back-side image taken in by the fisheye lens 112b in a state where the left end side and the right end side of the back-side image are partially missing.

Therefore, each imager can capture an image taken in by the fisheye lens in a larger size, and image quality can be improved. Note that, since the missing image portion in each imager is captured by the other imager, there is no hindrance for obtaining the omnidirectional image by the head mounted display 310.

Furthermore, in the third form, the head mounted display 310 creates the omnidirectional image by combining the front image and the back image obtained by the two imagers in the positional relationship similar to the two leather coverings of the baseball. Therefore, since the viewing angle up to the combination boundary in the left-right direction is considerably wide in the front side, users are less likely to feel incongruity in the image in the case of shaking the line-of-sight direction largely in the left-right direction.

Furthermore, in the third form, the image data of the front image and the back image each having the ultra-wide viewing angle obtained by the camera 110 are not combined, and transmitted from the personal computer 120 through the cloud server 210 to the head mounted display 310. Therefore, it is possible to suppress image quality degradation due to image combination and separation, and to improve image quality.

2. MODIFICATIONS

Note that, in the above-described embodiment, a configuration has been described in which the transmission side and the reception side are connected to each other via the Internet line; however, a configuration can also be considered similarly in which the connection is made via a wireless LAN such as WiFi. Furthermore, in the above-described embodiment, the reception side device is the head mounted display 310; however, this is not a limitation, and the reception side device may be another device, for example, a projector, a personal computer, a smartphone, a tablet, or the like.

Furthermore, the present technology may also be embodied in the configurations described below.

(1) A transmission device including:

an imaging unit that obtains a front image and a back image each having an ultra-wide viewing angle of greater than or equal to 180°; and a transmission unit that transmits the front image and the back image each having the ultra-wide viewing angle to an external device.

(2) The transmission device according to (1), in which the transmission unit further transmits, together with the front image and the back image each having the ultra-wide viewing angle, lens information for obtaining an omnidirectional image by pasting the two images on an inner surface of a sphere.

(3) The transmission device according to (1) or (2), in which the transmission unit combines and transmits the front image and the back image each having the ultra-wide viewing angle.

(4) The transmission device according to any of (1) to (3), in which the imaging unit includes a first imager that captures a front-side image taken in by a fisheye lens to obtain the front image having the ultra-wide viewing angle, and a second imager that captures a back-side image taken in by a fisheye lens to obtain the back image having the ultra-wide viewing angle.

(5) The transmission device according to (4), in which the second imager is arranged in a state of being rotated by 90° with respect to the first imager,
the first imager captures the front-side image taken in by the fisheye lens in a state where the upper end side and the lower end side of the front-side image are partially missing, and
the second imager captures the back-side image taken in by the fisheye lens in a state where the left end side and the right end side of the back-side image are partially missing.

(6) A transmission method including:
an imaging step of obtaining a front image and a back image each having an ultra-wide viewing angle of greater than or equal to 180°, by an imaging unit; and
a transmission step of transmitting the front image and the back image each having the ultra-wide viewing angle to an external device, by a transmission unit.

(7) A reception device including:
a reception unit that receives a front image and a back image each having an ultra-wide viewing angle of greater than or equal to 180° from an external device, in which
the front image having the ultra-wide viewing angle is obtained by capturing a front-side image taken in by a fisheye lens in a state where the upper end side and the lower end side of the front-side image are partially missing,
the front image having the ultra-wide viewing angle is obtained by capturing a back-side image taken in by a fisheye lens in a state where the left end side and the right end side of the back-side image are partially missing, and
the reception device further includes an image processing unit that obtains an omnidirectional image by pasting the front image and the back image each having the ultra-wide viewing angle on an inner surface of a sphere.

(8) The reception device according to (7), in which the reception unit further receives, together with the front image and the back image each having the ultra-wide viewing angle, lens information for obtaining the omnidirectional image by pasting the two images on the inner surface of the sphere, and
the image processing unit obtains the omnidirectional image by pasting the front image and the back image each having the ultra-wide viewing angle on the inner surface of the sphere on the basis of the lens information.

(9) A reception method including:
a reception step of receiving a front image and a back image each having an ultra-wide viewing angle of greater than or equal to 1800 from an external device, by a reception unit, in which
the front image having the ultra-wide viewing angle is obtained by capturing a front-side image taken in by a fisheye lens in a state where the upper end side and the lower end side of the front-side image are partially missing,
the front image having the ultra-wide viewing angle is obtained by capturing a back-side image taken in by a fisheye lens in a state where the left end side and the right end side of the back-side image are partially missing, and
the reception method further includes an image processing step of obtaining an omnidirectional image by pasting the front image and the back image each having the ultra-wide viewing angle on an inner surface of a sphere, by an image processing unit.

(10) An imaging device including:
a first imager that captures a front-side image taken in by a fisheye lens to obtain a front image having an ultra-wide viewing angle; and
a second imager that captures a back-side image taken in by a fisheye lens to obtain a back image having an ultra-wide viewing angle, in which
the second imager is arranged in a state of being rotated by 90° with respect to the first imager,
the first imager captures the front-side image taken in by the fisheye lens in a state where the upper end side and the lower end side of the front-side image are partially missing, and
the second imager captures the back-side image taken in by the fisheye lens in a state where the left end side and the right end side of the back-side image are partially missing.

REFERENCE SIGNS LIST

10 Distribution system
110 Camera
111 Housing
112*f*, 112*b* Fisheye lens
113*f*, 113*b* Imager
114*f*, 114*b* Imaging signal processing unit
115 Front and back image combining unit
116, 116*f*, 116*b* HDMI transmission unit
117 Control unit
120 Personal computer
121 Control unit
122 User operation unit
123, 123*f*, 123*b* HDMI reception unit
124, 124*f*, 124*b* Encoding unit
125 Network transmission unit
126 Front and back image combining unit
210 Cloud server
211 Reception server
212 Distribution server
310 Head mounted display
311 Control unit
312 User operation unit
313 Network reception unit
314, 314*f*, 314*b* Decoding unit
315 Front and back image separation unit
316 Image pasting unit
317 Display image acquisition unit
318 Display unit
319 Sensor unit
320 Back image rotation unit

The invention claimed is:
1. A transmission device comprising:
an imaging unit that obtains a front image and a back image each having an ultra-wide viewing angle of greater than or equal to 180°; and a transmission unit that transmits the front image and the back image each having the ultra-wide viewing angle to an external device, wherein the imaging unit includes a first imager having a first fisheye lens and a first light receiver that captures the front image having the ultra-wide viewing angle, and a second imager having a second fisheye lens and a second light receiver that captures the back image having the ultra-wide viewing angle, the first imager and the second imager are positioned in a back-to-back configuration such that the first fisheye lens and the second fisheye lens face opposite directions, the second light receiver is positioned to be rotated by 90° with respect to the first light receiver, the first light receiver captures the front image such that an upper end side and a lower end side of the front image as taken in by the first fisheye lens are partially missing, and the second light receiver captures the back image such that a left end side and a right end side of the back image as taken in by the second fisheye lens are partially missing.

2. The transmission device according to claim 1, wherein the transmission unit further transmits, together with the front image and the back image each having the ultra-wide viewing angle, lens information for obtaining an omnidirectional image by pasting the front image and the back image on an inner surface of a sphere.

3. The transmission device according to claim 1, wherein the transmission unit combines the front image and the back image each having the ultra-wide viewing angle into a combined image and transmits the combined image to the external device.

4. A transmission method comprising:

obtaining a front image and a back image each having an ultra-wide viewing angle of greater than or equal to 180° via an imaging unit; and transmitting the front image and the back image each having the ultra-wide viewing angle to an external device via a transmission unit, wherein the imaging unit includes a first imager having a first fisheye lens and a first light receiver that captures the front image having the ultra-wide viewing angle, and a second imager having a second fisheye lens and a second light receiver that captures the back image having the ultra-wide viewing angle, the first imager and the second imager are positioned in a back-to-back configuration such that the first fisheye lens and the second fisheye lens face opposite directions, the second light receiver is positioned to be rotated by 90° with respect to the first light receiver, the first light receiver captures the front image such that an upper end side and a lower end side of the front image as taken in by the first fisheye lens are partially missing, and the second light receiver captures the back image such that a left end side and a right end side of the back image as taken in by the second fisheye lens are partially missing.

5. The transmission method according to claim 4, further comprising:

transmitting, together with the front image and the back image each having the ultra-wide viewing angle, lens information for obtaining an omnidirectional image by pasting the front image and the back image on an inner surface of a sphere to the external device via the transmission unit.

6. The transmission method according to claim 4, wherein transmitting the front image and the back image each having the ultra-wide viewing angle further includes combining the front image and the back image into a combined image and transmitting the combined image to the external device via the transmission unit.

7. A reception device comprising:

a reception unit that receives a front image and a back image each having an ultra-wide viewing angle of greater than or equal to 180° from an external device, wherein the front image having the ultra-wide viewing angle is captured by a first light receiver such that an upper end side and a lower end side of the front image as taken in by a first fisheye lens are partially missing, the back image having the ultra-wide viewing angle is captured by a second light receiver such that a left end side and a right end side of the back image as taken in by a second fisheye lens are partially missing, the first fisheye lens and the second fisheye lens are positioned in a back-to-back configuration such that the first fisheye lens and the second fisheye lens face opposite directions, the second light receiver is positioned to be rotated by 90° with respect to the first light receiver, and the reception device further includes an image processing unit that obtains an omnidirectional image by pasting the front image and the back image each having the ultra-wide viewing angle on an inner surface of a sphere.

8. The reception device according to claim 7, wherein the reception unit further receives, together with the front image and the back image each having the ultra-wide viewing angle, lens information for obtaining the omnidirectional image, and the image processing unit obtains the omnidirectional image by pasting the front image and the back image each having the ultra-wide viewing angle on the inner surface of the sphere based on the lens information.

9. The reception device according to claim 7, wherein the omnidirectional image is obtained by pasting the back image at 90° with respect to the front image on the inner surface of the sphere.

10. The reception device according to claim 7, wherein the reception unit further receives a combined image comprising the front image and the back image from the external device and separates the combined image into the front image and the back image each having the ultra-wide viewing angle.

11. A reception method comprising:

receiving a front image and a back image each having an ultra-wide viewing angle of greater than or equal to 180° from an external device via a reception unit, wherein the front image having the ultra-wide viewing angle is captured by a first light receiver such that an upper end side and a lower end side of the front image as taken in by a first fisheye lens are partially missing, the back image having the ultra-wide viewing angle is captured by a second light receiver such that a left end side and a right end side of the back image as taken in by a second fisheye lens are partially missing, the first fisheye lens and the second fisheye lens are positioned in a back-to-back configuration such that the first fisheye lens and the second fisheye lens face opposite directions, the second light receiver is positioned to be rotated by 90° with respect to the first light receiver, and the reception method further includes obtaining an omnidirectional image by pasting the front image and the back image each having the ultra-wide viewing angle on an inner surface of a sphere via an image processing unit.

12. The reception method according to claim 11, wherein the reception unit further receives, together with the front image and the back image each having the ultra-wide viewing angle, lens information for obtaining the omnidirectional image, and the image processing unit obtains the omnidirectional image by pasting the front image and the back image each having the ultra-wide viewing angle on the inner surface of the sphere based on the lens information.

13. The reception method according to claim 11, wherein the omnidirectional image is obtained by pasting the back image at 90° with respect to the front image on the inner surface of the sphere.

14. The reception method according to claim 11, wherein the reception unit further receives a combined image comprising the front image and the back image from the external device and separates the combined image into the front image and the back image each having the ultra-wide viewing angle.

15. An imaging device comprising:

a first imager having a first fisheye lens and a first light receiver that captures a front-side image having an ultra-wide viewing angle; and a second imager having a second fisheye lens and a second light receiver that captures a back-side image having an ultra-wide viewing angle, wherein the first imager and the second imager are positioned in a back-to-back configuration such that the first fisheye lens and the second fisheye lens face opposite directions, and the second light receiver is positioned to be rotated by 90° with respect to the first light receiver, the first light receiver captures the front-side image such that an upper end side and a lower end side of the front-side image as taken in by the first fisheye lens are partially missing, and the second light receiver captures the back-side image such that a left end side and a right end side of the back-side image as taken in by the second fisheye lens are partially missing.

16. The imaging device according to claim 15, wherein the front-side image and the back-side image each having the ultra-wide viewing angle are pasted on an inner surface of a sphere based on lens information to obtain an omnidirectional image.

17. The imaging device according to claim 16, wherein the omnidirectional image is obtained by pasting the back-side image at 90° with respect to the front-side image on the inner surface of the sphere.

18. The imaging device according to claim 15, wherein the front-side image and the back-side image each having the ultra-wide viewing angle are combined to obtain a combined image.

* * * * *